United States Patent
Towler et al.

(10) Patent No.: US 12,544,262 B2
(45) Date of Patent: Feb. 10, 2026

(54) FLUID DRAINAGE DEVICES, SYSTEMS, AND METHODS

(71) Applicant: W. L. Gore & Associates, Inc., Newark, DE (US)

(72) Inventors: Jeffrey C. Towler, Wilmington, DE (US); Peter J. Roeber, Oxford, PA (US); Kevin M. Savory, West Grove, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 541 days.

(21) Appl. No.: 17/980,431

(22) Filed: Nov. 3, 2022

(65) Prior Publication Data

US 2023/0142430 A1    May 11, 2023

Related U.S. Application Data

(60) Provisional application No. 63/276,183, filed on Nov. 5, 2021.

(51) Int. Cl.
*A61F 9/007* (2006.01)
*A61F 9/00* (2006.01)

(52) U.S. Cl.
CPC ........ *A61F 9/00781* (2013.01); *A61F 9/0017* (2013.01); *A61M 2210/0612* (2013.01)

(58) Field of Classification Search
CPC . A61F 9/00781; A61F 9/0017; A61M 27/002; A61M 2210/0612; A61M 27/00; A61M 2027/004; A61M 27/006
See application file for complete search history.

(56) References Cited

U.S. PATENT DOCUMENTS

| | | |
|---|---|---|
| 4,186,184 A | 1/1980 | Zaffaroni |
| 4,554,918 A | 11/1985 | White |

(Continued)

FOREIGN PATENT DOCUMENTS

| | | |
|---|---|---|
| AU | 2014280907 A1 | 1/2015 |
| AU | 2015266850 A1 | 12/2016 |

(Continued)

OTHER PUBLICATIONS

Doble, M., Makadia, N., Pavithran, S., & Kumar, R. S. (2008). Analysis of explanted ePTFE cardiovascular grafts (modified BT shunt). Biomedical Materials, 3(3), 034118. (Year: 2008).*

(Continued)

*Primary Examiner* — Adam Marcetich
(74) *Attorney, Agent, or Firm* — Nelson Mullins Riley & Scarborough LLP

(57) ABSTRACT

Glaucoma shunts for draining fluid from an eye to surrounding tissue and being implantable within eye tissue, the shunts include a shunt body formed from microporous materials arranged to form a reservoir within the shunt body, and a conduit having a proximal end in fluid communication with the reservoir and an opposing distal end, the distal end being insertable into the eye to facilitate drainage of fluid into the conduit via the distal end, wherein the conduit and the reservoir together define a flow passage along which drainage of fluid flows through the conduit, to the reservoir, and into surrounding tissue via the microporous material, wherein the flow passage presents a variable flow resistance along the conduit that has a plurality of sequential flow resistances with first and second flow resistances defined therein such that the first flow resistance is different from the second flow resistance.

34 Claims, 14 Drawing Sheets

(56) References Cited

U.S. PATENT DOCUMENTS

| | | | |
|---|---|---|---|
| 4,729,761 A | 3/1988 | White | |
| 5,026,395 A * | 6/1991 | Nakajima | A61F 2/1613 |
| | | | 623/6.57 |
| 5,476,445 A | 12/1995 | Baerveldt et al. | |
| 5,676,679 A | 10/1997 | Simon et al. | |
| 6,050,970 A | 4/2000 | Baerveldt | |
| 6,086,612 A | 7/2000 | Jansen | |
| 6,142,969 A | 11/2000 | Nigam | |
| 6,186,974 B1 | 2/2001 | Allan et al. | |
| 6,261,256 B1 | 7/2001 | Ahmed | |
| 6,562,446 B1 | 5/2003 | Totsuka | |
| 6,881,197 B1 | 4/2005 | Nigam | |
| 7,883,717 B2 | 2/2011 | Varner et al. | |
| 8,632,489 B1 | 1/2014 | Ahmed | |
| 9,216,108 B2 | 12/2015 | Jain et al. | |
| 9,375,347 B2 | 6/2016 | Stergiopulos | |
| 9,849,629 B2 | 12/2017 | Zaggl et al. | |
| 10,398,593 B2 | 9/2019 | Erickson et al. | |
| 10,398,707 B2 | 9/2019 | Hughes | |
| 10,849,731 B2 | 12/2020 | Cully et al. | |
| 10,959,941 B2 | 3/2021 | Haffner | |
| 11,351,058 B2 | 6/2022 | Roeber et al. | |
| 11,406,533 B2 | 8/2022 | Roeber et al. | |
| 2002/0156413 A1* | 10/2002 | Williams | A61F 9/00781 |
| | | | 604/8 |
| 2002/0165478 A1 | 11/2002 | Gharib et al. | |
| 2003/0014036 A1 | 1/2003 | Varner et al. | |
| 2003/0027332 A1 | 2/2003 | Lafrance et al. | |
| 2003/0229303 A1 | 12/2003 | Haffner et al. | |
| 2005/0234546 A1 | 10/2005 | Lock et al. | |
| 2005/0250788 A1 | 11/2005 | Tu et al. | |
| 2005/0267398 A1 | 12/2005 | Protopsaltis et al. | |
| 2008/0147021 A1* | 6/2008 | Jani | A61K 9/0051 |
| | | | 604/288.01 |
| 2008/0268314 A1 | 10/2008 | Han et al. | |
| 2009/0043321 A1 | 2/2009 | Conston et al. | |
| 2009/0226731 A1 | 9/2009 | Wittmann et al. | |
| 2009/0240215 A1 | 9/2009 | Humayun et al. | |
| 2009/0325030 A1 | 12/2009 | Hamrock et al. | |
| 2010/0082094 A1 | 4/2010 | Quadri et al. | |
| 2010/0114006 A1 | 5/2010 | Baerveldt | |
| 2010/0137981 A1 | 6/2010 | Silvestrini et al. | |
| 2010/0185138 A1 | 7/2010 | Yaron et al. | |
| 2010/0185277 A1 | 7/2010 | Braido et al. | |
| 2010/0234793 A1* | 9/2010 | Dacey, Jr. | A61B 5/14546 |
| | | | 604/8 |
| 2010/0241241 A1* | 9/2010 | McKnight | A61F 2/04 |
| | | | 623/24 |
| 2010/0259748 A1 | 10/2010 | Suzuki | |
| 2011/0027579 A1 | 2/2011 | Tate | |
| 2011/0028918 A1 | 2/2011 | Hartwell et al. | |
| 2011/0275912 A1* | 11/2011 | Boyden | A61L 2/24 |
| | | | 600/309 |
| 2011/0288635 A1 | 11/2011 | Miller et al. | |
| 2012/0035525 A1* | 2/2012 | Silvestrini | A61F 9/00781 |
| | | | 604/8 |
| 2012/0089073 A1 | 4/2012 | Cunningham, Jr. | |
| 2012/0141914 A1 | 6/2012 | Namba et al. | |
| 2012/0253453 A1 | 10/2012 | Bruchman et al. | |
| 2012/0310137 A1* | 12/2012 | Silvestrini | A61F 9/00781 |
| | | | 604/8 |
| 2013/0131577 A1 | 5/2013 | Bronstein et al. | |
| 2013/0184810 A1 | 7/2013 | Hall et al. | |
| 2013/0190868 A1* | 7/2013 | Kahook | A61F 2/1635 |
| | | | 623/6.38 |
| 2013/0226330 A1 | 8/2013 | Sopori et al. | |
| 2014/0039468 A1 | 2/2014 | Dunn | |
| 2014/0236068 A1 | 8/2014 | Van et al. | |
| 2014/0243729 A1 | 8/2014 | Rynerson | |
| 2014/0343475 A1 | 11/2014 | Smedley et al. | |
| 2014/0343476 A1* | 11/2014 | Penhasi | A61F 9/00781 |
| | | | 604/8 |
| 2015/0057595 A1 | 2/2015 | Gunn et al. | |
| 2015/0342875 A1 | 12/2015 | Haffner | |
| 2016/0000602 A1* | 1/2016 | Meng | A61F 9/0017 |
| | | | 604/891.1 |
| 2016/0058616 A1* | 3/2016 | Camras | A61F 9/00781 |
| | | | 604/9 |
| 2016/0242962 A1 | 8/2016 | Torello et al. | |
| 2016/0270958 A1 | 9/2016 | De et al. | |
| 2017/0020731 A1 | 1/2017 | Baerveldt | |
| 2017/0092974 A1 | 3/2017 | Macphee | |
| 2017/0141423 A1 | 5/2017 | Okada et al. | |
| 2018/0028361 A1 | 2/2018 | Haffner et al. | |
| 2018/0071143 A1 | 3/2018 | Silvestrini et al. | |
| 2018/0110650 A1 | 4/2018 | Da Silva Curiel et al. | |
| 2018/0125632 A1* | 5/2018 | Cully | A61L 27/36 |
| 2018/0126134 A1 | 5/2018 | Cully et al. | |
| 2018/0263718 A1 | 9/2018 | Griffiths et al. | |
| 2018/0263817 A1 | 9/2018 | Roeber et al. | |
| 2018/0263818 A1 | 9/2018 | Roeber et al. | |
| 2018/0263819 A1 | 9/2018 | Roeber et al. | |
| 2018/0303752 A1 | 10/2018 | Haffner | |
| 2018/0325732 A1 | 11/2018 | Burns et al. | |
| 2018/0344526 A1 | 12/2018 | Pinchuk | |
| 2019/0000673 A1 | 1/2019 | Fjield et al. | |
| 2019/0046696 A1 | 2/2019 | Parikh et al. | |
| 2019/0105199 A1 | 4/2019 | Ahmed et al. | |
| 2019/0167475 A1 | 6/2019 | Horvath et al. | |
| 2019/0224047 A1 | 7/2019 | Kao et al. | |
| 2019/0298572 A1 | 10/2019 | Chu | |
| 2020/0188147 A1* | 6/2020 | Throckmorton | A61M 27/002 |
| 2020/0214886 A1* | 7/2020 | Gutierrez | A61B 3/00 |
| 2020/0214887 A1* | 7/2020 | Gutierrez | A61K 9/0009 |
| 2020/0229977 A1 | 7/2020 | Mixter et al. | |
| 2020/0337897 A1 | 10/2020 | Sacherman et al. | |
| 2021/0315806 A1 | 10/2021 | Haffner | |
| 2022/0080049 A1 | 3/2022 | Garcia et al. | |
| 2022/0331162 A1 | 10/2022 | Roeber et al. | |
| 2022/0354996 A1* | 11/2022 | Engman | A61L 27/3604 |
| 2022/0378611 A1 | 12/2022 | Conia et al. | |
| 2022/0395397 A1 | 12/2022 | Chu | |
| 2023/0054622 A1 | 2/2023 | Roeber et al. | |
| 2023/0117758 A1 | 4/2023 | Roeber et al. | |
| 2023/0142433 A1 | 5/2023 | Towler et al. | |
| 2023/0218286 A1 | 7/2023 | McAlister et al. | |

FOREIGN PATENT DOCUMENTS

| | | |
|---|---|---|
| AU | 2020201236 A1 | 3/2020 |
| AU | 2017439185 A1 | 5/2020 |
| AU | 2021218010 A1 | 9/2021 |
| CA | 2974600 A1 | 10/2015 |
| CA | 2950187 A1 | 12/2015 |
| CN | 1976732 A | 6/2007 |
| CN | 103619366 A | 3/2014 |
| CN | 104114201 A | 10/2014 |
| CN | 104168863 A | 11/2014 |
| CN | 105377202 A | 3/2016 |
| EP | 2226624 A1 | 9/2010 |
| EP | 2472297 A1 | 7/2012 |
| EP | 3148491 A1 | 4/2017 |
| EP | 3677229 A1 | 7/2020 |
| EP | 3773377 A1 | 2/2021 |
| JP | 08-117267 A | 5/1996 |
| JP | 2005-121438 A | 5/2005 |
| JP | 2005-294016 A | 10/2005 |
| JP | 2008-101926 A | 5/2008 |
| JP | 2011-507631 A | 3/2011 |
| JP | 2012-164647 A | 8/2012 |
| JP | 2014-199348 A | 10/2014 |
| JP | 2014-239034 A | 12/2014 |
| JP | 2015-175815 A | 10/2015 |
| JP | 2017-517363 A | 6/2017 |
| JP | 6655610 B2 | 2/2020 |
| JP | 2020-075162 A | 5/2020 |
| JP | 6872650 B2 | 5/2021 |
| JP | 2021-112598 A | 8/2021 |
| KR | 10-2008-0020259 A | 3/2008 |
| KR | 10-2016-0026107 A | 3/2016 |
| WO | 2002/100318 A2 | 12/2002 |
| WO | 03/15659 A2 | 2/2003 |
| WO | 2008/030246 A2 | 3/2008 |

(56) References Cited

FOREIGN PATENT DOCUMENTS

| WO | 2009/137785 | A2 | 11/2009 |
|---|---|---|---|
| WO | 2012/142318 | A1 | 10/2012 |
| WO | 2014/130574 | A1 | 8/2014 |
| WO | 2015/064312 | A1 | 5/2015 |
| WO | 2015/126332 | A1 | 8/2015 |
| WO | 2015/184173 | A1 | 12/2015 |
| WO | 2017/156293 | A1 | 9/2017 |
| WO | 2019/018807 | A1 | 1/2019 |
| WO | 2019/094004 | A1 | 5/2019 |
| WO | 2020/047221 | A1 | 3/2020 |
| WO | 2020/047222 | A1 | 3/2020 |

OTHER PUBLICATIONS

Tang, H., Zhang, Y., Wang, F., Zhang, H., & Guo, Y. (2016). Long-term stability of polytetrafluoroethylene (PTFE) hollow fiber membranes for CO2 capture. Energy & Fuels, 30(1), 492-503. (Year: 2016).*
"The Ahmed Glaucoma Valve Model FP7," New World Medical, Inc., Part #50-0088 Rev C, Url: htps://www.newworldmedical.com/wp-content/uploads/2020/07/AGV-FP7-IFU-50-0088-Rev-C.pdf, Nov. 2019, pp. 1-28.
International Search Report and Written Opinion received for PCT Patent Application No. PCT/US2023/010660, mailed on May 24, 2023, 17 pages.
International Search Report and Written Opinion received for PCT Patent Application No. PCT/US2022/031305, mailed on Nov. 7, 2022, 26 pages.
International Search Report and Written Opinion received for PCT Patent Application No. PCT/US2022/048960, mailed on Mar. 2, 2023, 17 pages.
International Search Report and Written Opinion received for PCT Patent Application No. PCT/US2022/048971, mailed on Apr. 24, 2023, 19 pages.
Kahook et al., "Location of glaucoma drainage devices relative to the optic nerve," British Journal of Ophthalmol, vol. 90, No. 8, Aug. 2006, pp. 1010-1013.
McMenamin et al., "Normal anatomy of the aqueous humour outflow system in the domestic pig eye," Journal of Anatomy, vol. 178, Oct. 1991, pp. 65-77.

Mohammadi et al., "Sheep practice eye for ophthalmic surgery training in skills laboratory," Journal of Cataract and Refractive Surgery, vol. 37, No. 6, Jun. 2011, pp. 987-991.
Palioura S. et al., "Role of steroids in the treatment of bacterial keratitis," Clinical Ophthalmology. vol. 10, Jan. 27, 2016, pp. 179-186.
Plemel et al., "Tube shunt surgery in pig eyes: a wet lab teaching model," Canadian Journal of Ophthalmology, vol. 54, Issue 5, Oct. 2019, pp. 585-589.
International Preliminary Report on Patentability received for PCT Patent Application No. PCT/US2022/031305, mailed on Dec. 7, 2023, 18 pages.
International Preliminary Report on Patentability received for PCT Patent Application No. PCT/US2023/010660, mailed on Jul. 25, 2024, 10 pages.
International Preliminary Report on Patentability received for PCT Patent Application No. PCT/US22/48960, mailed on May 16, 2024, 10 pages.
International Preliminary Report on Patentability received for PCT Patent Application No. PCT/US22/48971, mailed on May 16, 2024, 13 pages.
Invitation to pay additional fees received for PCT Patent Application No. PCT/US22/31305, mailed on Sep. 15, 2022, 23 pages.
Invitation to pay additional fees received for PCT Patent Application No. PCT/US22/48971, mailed on Mar. 2, 2023, 13 pages.
Lee et al., "Pig eye trabeculectomy—a wet-lab teaching model," Eye, vol. 20, Jan. 28, 2005, pp. 32-37.
Miyazaki, et al., Expanded polytetrafluoroethylene conduits and patches with bulging sinuses and fan-shaped valves in right ventricular outflow tract reconstruction: Multicneter study in Japan. The Journal of Thoracic and Cardiovascula Surgery, Nov. 2011, vol. 142, No. 5, pp. 1122-1129.
Office Action received for Chinese Patent Application No. 202110966241.1, mailed on May 15, 2024, 11 pages (5 pages of English Translation and 6 pages of Original Document).
Shastri, V et al. Non-Degradable Biocompatible Polymers in Medicine: Past, Present, and Future. Current Pharmaceutical Biotechnology, vol. 4, No. 5, 2003, pp. 331-337 [online], [retrieved on Nov. 8, 2023], Retrieved from the Internet <URL: https://pubmed.ncbi.nlm.nih.gov/14529423/> (Year: 2003).

* cited by examiner

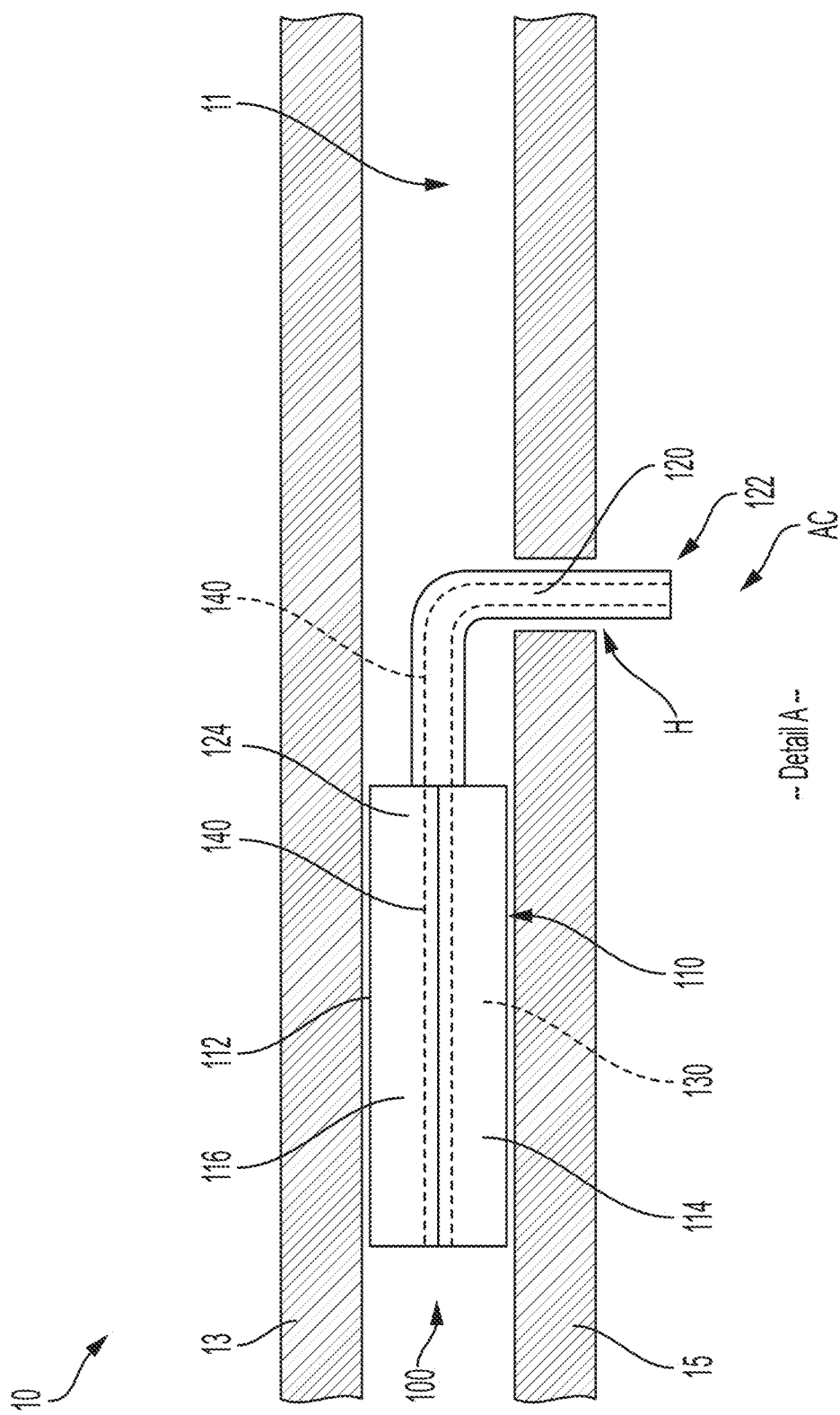

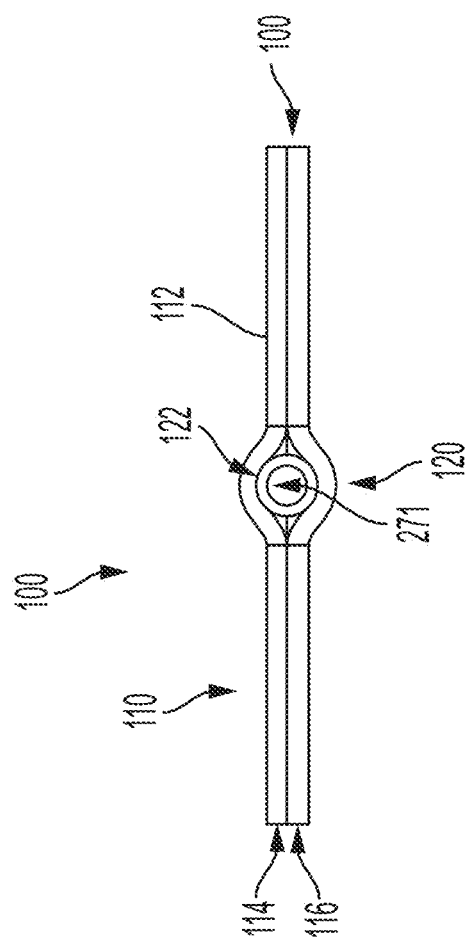
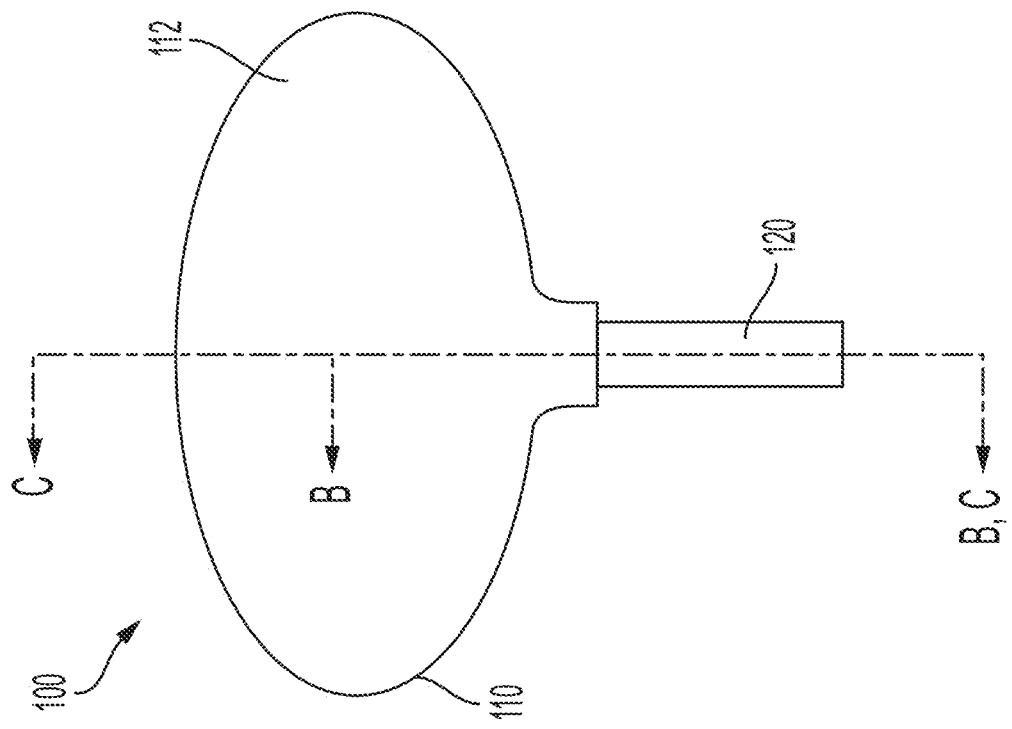
FIG. 2B
FIG. 2A

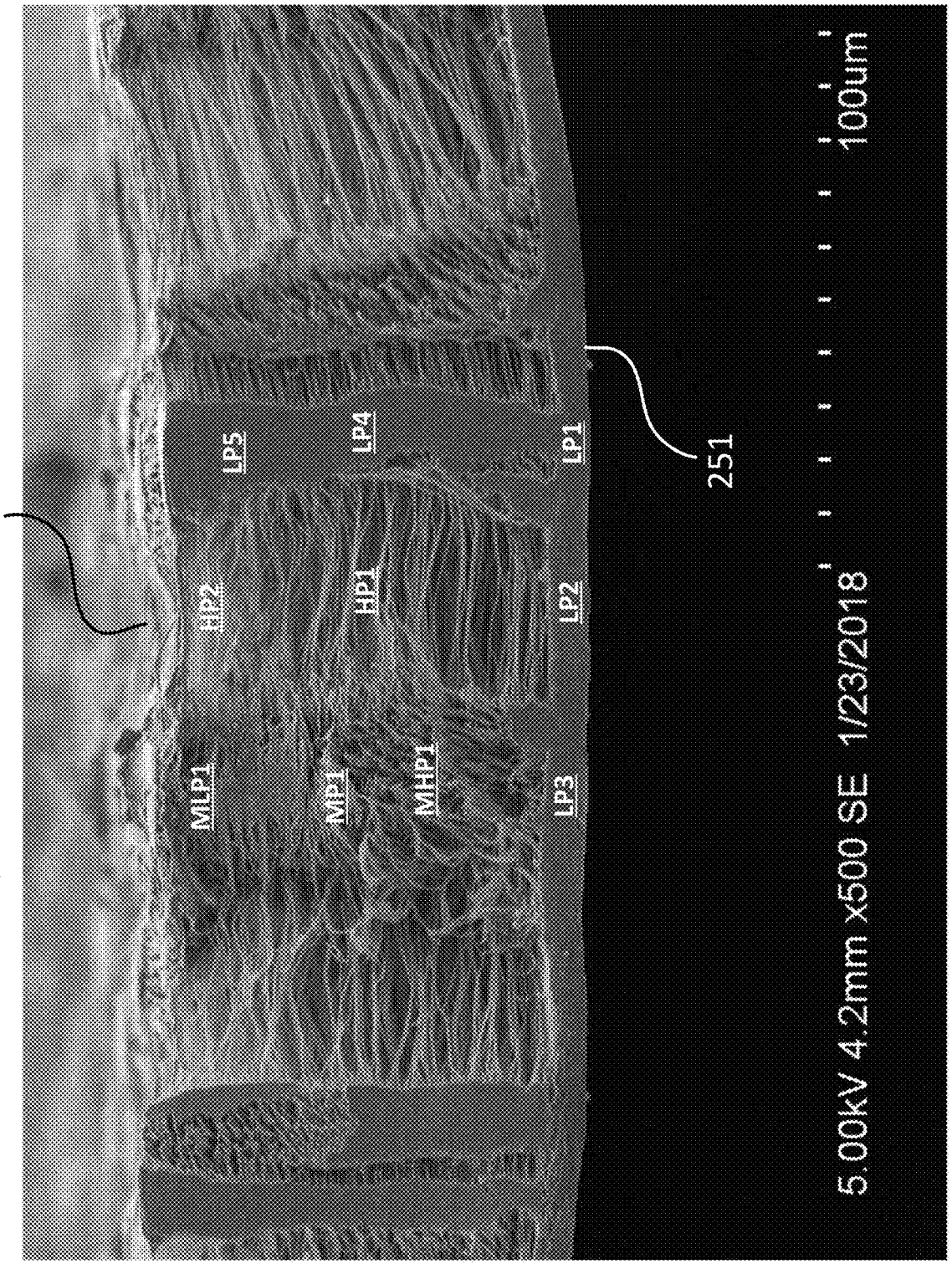

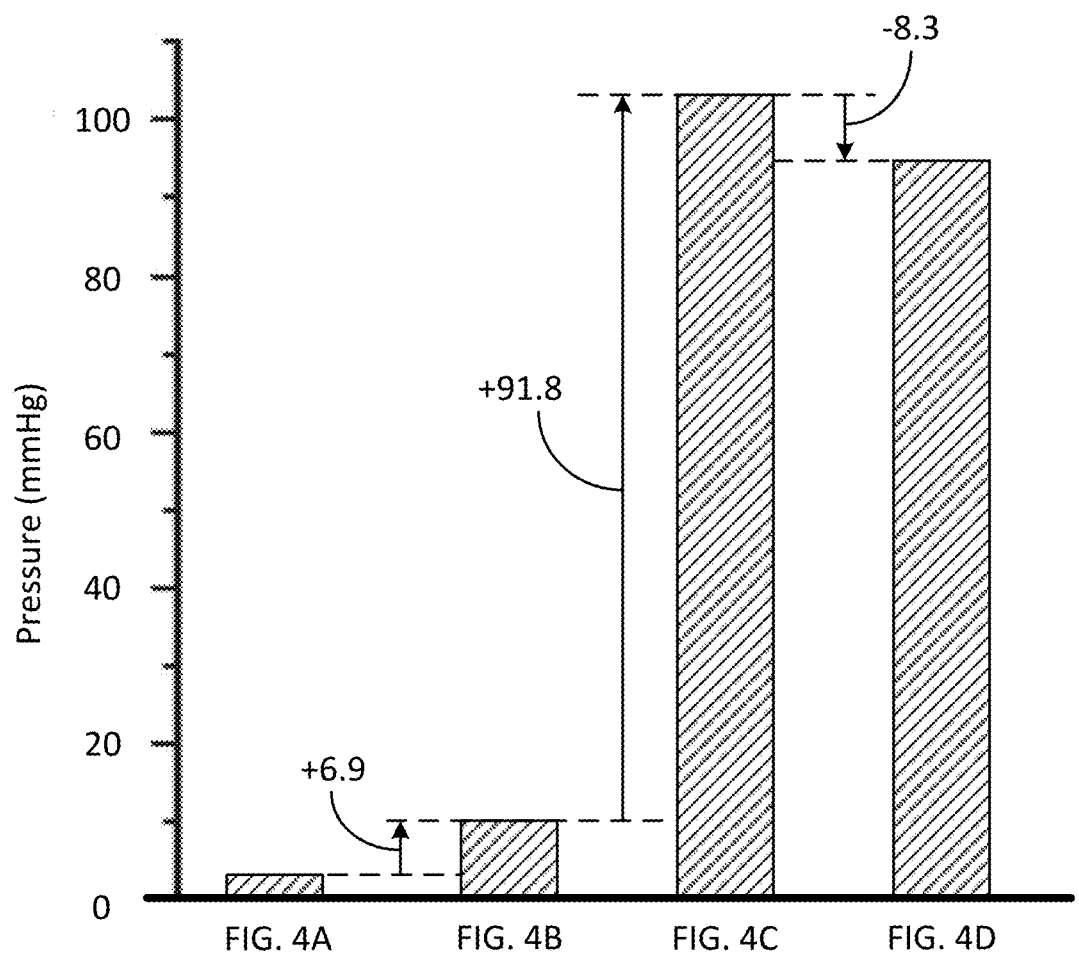

FLUID DRAINAGE DEVICES, SYSTEMS, AND METHODS

CROSS-REFERENCE TO RELATED APPLICATION

This application claims priority to U.S. Provisional Application No. 63/276,183, filed Nov. 5, 2021, which is hereby incorporated by reference in its entirety.

FIELD

The present disclosure relates generally to apparatuses, systems, and methods for draining fluid and diverting the fluid to be reabsorbed elsewhere in the body. More specifically, the disclosure relates to apparatuses, systems, and methods for draining aqueous humor from the anterior chamber of a patient's eye such that it may be reabsorbed by the body.

BACKGROUND

Various medical interventions involve evacuating excess fluid, e.g. biological fluid, from one portion of the body and redirecting it to another location of the body where it can be reabsorbed. In certain instances, this evacuation is achieved via minimally invasive procedures such as endoscopic third ventriculostomy (ETV) and choroid plexus cauterization procedure (CPC). In other instances, this evacuation is performed post-operatively via implantable medical devices, such as a shunt. Proven useful in various medical procedures, shunts of different forms have been employed as treatment for numerous diseases, such as hydrocephalus and glaucoma.

Without treatment, excessive fluid can lead to unhealthy pressure build ups. For instance, glaucoma is a progressive eye disease characterized by elevated intraocular pressure. Aqueous humor is a fluid that fills the anterior chamber of the eye and contributes to intraocular pressure or intraocular fluid pressure. This increase in intraocular pressure is usually caused by an insufficient amount of aqueous humor absorbed by the body. In some cases, the aqueous humor is not absorbed quickly enough or even not absorbed at all, while in other cases, the aqueous humor is additionally or alternatively produced too quickly. Elevated intraocular pressure is associated with gradual and sometimes permanent loss of vision in the affected eye.

Many attempts have been made to treat glaucoma. However, some conventional devices are relatively bulky and lack flexibility, compliance, and device/tissue attachment required to avoid relative motion between the device and the surrounding tissue. Such movement can result in continued stimulation of the surrounding tissue, causing irritation at the implantation site. Irritation, in turn, can lead to increased chronic inflammatory tissue response, excessive scarring at the device site, and increased risk of device erosion through conjunctival and endophthalmitis. Scar tissue effectively prevents resorption of aqueous humor without erosion. These complications may prevent the device from functioning properly. The result is a gradual rise in intraocular pressure and progression of glaucoma.

SUMMARY

According to an example ("Example 1"), a glaucoma shunt for draining a fluid from an eye to a tissue surrounding the eye, the glaucoma shunt being implantable at least in part within the tissue of the eye, the glaucoma shunt includes a shunt body that is formed from a microporous material that is arranged so as to form a reservoir within the shunt body; and a conduit having a proximal end in fluid communication with the reservoir and a distal end that opposes the proximal end, the conduit distal end being insertable into the eye so as to facilitate a drainage of the fluid into the conduit via the distal end of the conduit, wherein the conduit and the reservoir together define a flow passage along which the drainage of the fluid flows through the conduit, to the reservoir, and into the tissue surrounding the eye via the microporous material, wherein the flow passage presents a variable flow resistance along the conduit that has a plurality of sequential flow resistances with a first flow resistance and a second flow resistance defined therein such that the first flow resistance is optionally different from the second flow resistance.

According to another example ("Example 2"), further to Example 1, wherein the shunt body has a continuous wall that defines the reservoir and a reservoir opening in the continuous wall communicating with the internal reservoir and through which the conduit is engagingly receive; and wherein at least a portion of the continuous wall has a wall portion composed of the microporous material, the wall portion having an internal side facing the internal reservoir and an opposing external side facing the exterior region of the human eye, the wall portion internal side optionally having a low porosity surface extending an entirety of the wall portion internal side, the wall portion external side optionally having an alternating surface comprising the low porosity surface disposed between high porosity surfaces.

According to another example ("Example 3"), further to Example 1, wherein the first flow resistance is less than the second flow resistance.

According to another example ("Example 4"), further to Example 1, wherein the first flow resistance is greater than the second flow resistance.

According to another example ("Example 5"), further to Example 1, wherein the microporous material defines a third flow resistance of the flow passage.

According to another example ("Example 6"), further to Example 5, wherein the microporous material is configured to transition from a hydrophobic state to a hydrophilic state when exposed to the fluid, and wherein the second flow resistance optionally corresponds to a rate of change in pressure with respect to a flow rate over time as the fluid engages the microporous material that defines the reservoir.

According to another example ("Example 7"), further to Example 6, wherein the rate of change corresponds to a tightness in a porosity of the microporous material.

According to another example ("Example 8"), further to Example 7, wherein the microporous material has a variable porosity across a thickness of the microporous material.

According to another example ("Example 9"), further to Example 5, wherein the first flow resistance corresponds to a ratio of an inner diameter of the conduit to a thickness of the conduit.

According to another example ("Example 10"), further to Example 1, wherein the first flow resistance and the second flow resistance are oriented in a series arrangement such that the fluid flowing through the flow passage optionally encounters the first flow resistance before encountering the second flow resistance.

According to another example ("Example 11"), further to Example 1, wherein the variable flow resistance along the conduit further includes a third flow resistance.

According to another example ("Example 12"), further to Example 11, wherein each of the first flow resistance and the third flow resistance is greater than the second flow resistance.

According to another example ("Example 13"), further to Example 11, wherein each of the first flow resistance, the second flow resistance, and the third flow resistance is different from one another.

According to another example ("Example 14"), a drainage device for directing a drainage from an internal portion of an eye to a portion of a body external to the eye, the drainage device comprising a flow passage that is configured to facilitate the drainage of a fluid from the internal portion of the eye to a surrounding tissue that is external to the eye, wherein the flow passage includes a variable flow resistance to the drainage that passes through the flow passage, the flow passage having a first flow resistance portion with a first flow resistance and a second flow resistance portion with a second flow resistance, the first flow resistance optionally being different from the second flow resistance.

According to another example ("Example 15"), further to Example 14, wherein the first flow resistance is less than the second flow resistance.

According to another example ("Example 16"), further to Example 14, wherein the first flow resistance is greater than the second flow resistance.

According to another example ("Example 17"), further to Example 14, wherein the flow passage is positioned between a microporous material that is configured to transition from a hydrophobic state to a hydrophilic state when exposed to the drainage, and wherein the second flow resistance optionally corresponds to a rate of change in pressure with respect to a flow rate over time as the fluid engages the microporous material.

According to another example ("Example 18"), further to Example 17, wherein the rate of change corresponds to a tightness in a porosity of the microporous material.

According to another example ("Example 19"), further to Example 18, wherein the microporous material has a variable porosity across a thickness of the microporous material.

According to another example ("Example 20"), further to Example 14, wherein the first flow resistance corresponds to a diameter of the flow passage.

According to another example ("Example 21"), further to Example 14, wherein the first flow resistance and the second flow resistance are oriented in a series arrangement such that the fluid flowing through the flow passage optionally encounters the first flow resistance before encountering the second flow resistance.

According to another example ("Example 22"), further to Example 14, wherein the flow passage further has a third flow resistance portion with a third flow resistance.

According to another example ("Example 23"), further to Example 22, wherein each of the first flow resistance and the third flow resistance is greater than the second flow resistance.

According to another example ("Example 24"), further to Example 22, wherein each of the first flow resistance, the second flow resistance, and the third flow resistance is different from one another.

According to another example ("Example 25"), a method of forming a drainage device, the method includes arranging one or more microporous materials so as to form a device body with a reservoir defined therein, the reservoir being configured to receive and accumulate fluid; and securing a conduit to the reservoir such that the conduit is in fluid communication with the reservoir, wherein the conduit and the reservoir define a flow passage of the drainage device, and wherein the flow passage includes a variable flow resistance to a drainage that passes through the flow passage, the flow passage having a first flow resistance portion with a first flow resistance and a second flow resistance portion with a second flow resistance, the first flow resistance optionally being different from the second flow resistance.

According to another example ("Example 26"), further to Example 25, wherein forming the reservoir comprises securing a first portion of the microporous material to a second portion of the microporous material so as to optionally form the reservoir therebetween, the method further comprising securing the conduit between the first portion and the second portion, the conduit being configured to receive the drainage.

According to another example ("Example 27"), further to Example 26, wherein the one or more microporous materials comprise a first layer having a first microporous membrane bonded to a second microporous membrane and a second layer comprising a third microporous membrane bonded to a fourth microporous membrane, and wherein securing the first portion to the second portion optionally comprises bonding the second microporous membrane to the third microporous membrane.

According to another example ("Example 28"), further to Example 27, wherein the second and third microporous membranes are bonded to each other along peripheral edges of the first and second layers to define an inflatable reservoir disposed between the second and third microporous membranes, wherein the second and third microporous membranes are optionally configured to resist tissue ingrowth, and wherein the first and fourth microporous membranes are optionally configured to perm it tissue ingrowth, and wherein the second and third microporous membranes optionally have an expanded state that is maintained adjacent to the peripheral edges of the first and second layers.

According to another example ("Example 29"), further to Example 27, wherein securing the first portion to the second portion comprises refraining from bonding the first microporous membrane to the fourth microporous membrane.

According to another example ("Example 30"), further to Example 27, wherein securing the first portion to the second portion comprises arranging the first layer and the second layer in a stacked configuration such that the first microporous membrane and the fourth microporous membrane are outermost membranes of the device body and the second microporous membrane and the third microporous membrane are innermost membranes of the device body.

According to another example ("Example 31"), a glaucoma drainage device for draining a fluid from an interior region of a human eye to an exterior region of the human eye, the glaucoma drainage device includes a body having a continuous wall defining an internal reservoir within the body and a reservoir opening in the continuous wall communicating with the internal reservoir; and a conduit extending from the body by a conduit length, the conduit having opposing first and second conduit ends defining a passage through the conduit extending between the opposing first and second ends, the conduit first end engaging the internal reservoir opening to provide a fluidic connection between the conduit second end and the internal reservoir, the conduit length being sufficient to dispose the conduit first end at the exterior region of the human eye and to dispose the conduit second end at the interior region of the human eye, wherein at least a portion of the continuous wall optionally has a wall portion composed of a microporous material, the wall portion having an internal side facing the internal reservoir and an opposing external side facing the exterior region of the human eye, the wall portion internal side optionally having a low porosity surface extending an entirety of the wall portion internal side, the wall portion external side optionally having an alternating surface comprising the low porosity surface disposed between high porosity surfaces.

According to another example ("Example 32"), further to Example 31, wherein the wall portion defines a wall portion thickness extending between the internal side and the external side, the wall portion thickness optionally defining an internal region of the wall portion having a transition porosity that is between a porosity of the low porosity surface of the internal side and a porosity of the high porosity surface of the external side.

According to another example ("Example 33"), further to Example 31, wherein the wall portion defines a wall portion thickness extending between the internal side and the external side, the wall portion thickness optionally defining an internal region of the wall portion extending between the low porosity surface of the internal side and the low porosity surface of the external side, the internal region optionally having an internal region porosity that is equal to porosities of the low porosity surfaces of the internal side and the external side.

According to another example ("Example 34"), further to Example 31, wherein the wall portion defines a wall portion thickness extending between the internal side and the external side, the wall portion thickness optionally defining an internal region of the wall portion extending between the low porosity surface of the internal side and the high porosity surface of the external side, the internal region optionally having an internal region porosity that is equal to a porosity of the low porosity surface of the internal side.

According to another example ("Example 35"), further to Example 31, wherein the wall portion defines a wall portion thickness extending between the internal side and the external side, the wall portion thickness optionally defining an internal region of the wall portion extending between the low porosity surface of the internal side and the high porosity surface of the external side, the internal region optionally having an internal region porosity that is equal to a porosity of the high porosity surface of the external side.

According to another example ("Example 36"), further to Example 31, wherein the fluidic connection between the conduit second end and the internal reservoir further extends from the internal reservoir through the microporous material to optionally provide a fluidic communication from the internal reservoir to the exterior region of the human eye.

According to another example ("Example 37"), further to Example 36, wherein the fluidic communication defines a flow path through the microporous material.

According to another example ("Example 38"), further to Example 37, wherein the flow path through the microporous material is in a direction that is directed away from the internal reservoir.

According to another example ("Example 39"), further to Example 37, wherein the flow path through the microporous material proceeds from a low porosity microporous region to a high porosity microporous region.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

FIG. 1C is a schematic representation of the implanted drainage device at Detail A2 in FIG. 1B;

FIG. 2A is a side-view illustration of a drainage system in the form of a glaucoma shunt consistent with various aspects of the present disclosure;

FIG. 2B is a bottom-view illustration of the drainage system of FIG. 2A;

FIG. 3C is an SEM image of a portion of the microstructure schematically illustrated in the drainage system of FIGS. 3A and 3B, with the SEM image scaled as shown;

FIG. 4E is a bar graph comparing the measured pressure values associated with the components in FIGS. 4A through 4D and implications of various modifications to those components;

DETAILED DESCRIPTION

Definitions and Terminology

Figure 1A:
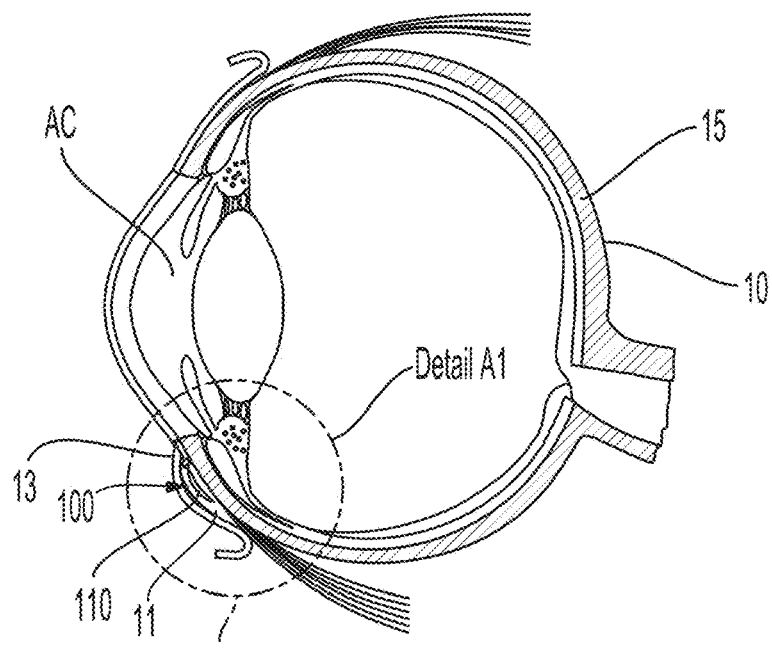
FIG. 1A is an illustration of an eye with a drainage system implanted therein consistent with various aspects of the present disclosure.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

Description of Various Embodiments

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Figure 1B:
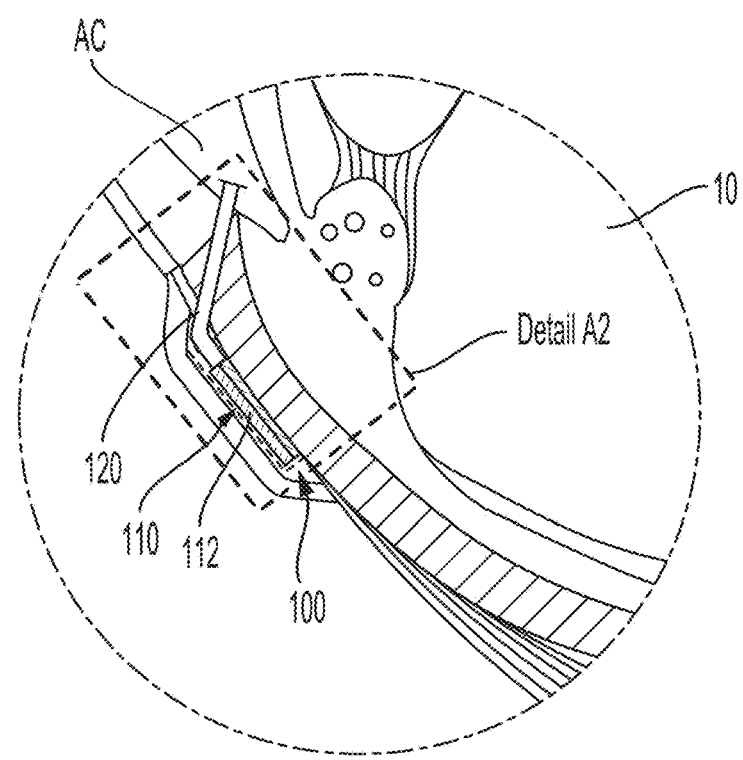
FIG. 1B is an illustration of a cross section of Detail A1 from FIG. 1A.

Various features of devices, systems, and methods disclosed herein can be seen in FIGS. 1A-1C. Aspects of the present disclosure relate to drainage devices, systems, and methods for fluids including but not limited to biological fluids. More particularly, the present disclosure relates to devices, systems, and methods for draining aqueous humor from the anterior chamber CAC' of an eye 10 of a patient so that the aqueous humor may be resorbed by the body elsewhere. To that end, FIG. 1A is an illustration of an eye 10 with a subconjunctival space 11 between a conjunctiva 13 and a sclera 15 of the eye 10. Implanted within the eye 10 is a drainage system 100 in accordance with principles of the present disclosure. FIG. 1B shows a cross section of detail A1 from FIG. 1A. FIG. 1C shows a schematic representation of the implanted drainage device 110 at Detail A2 in FIG. 1B. In an aspect of the present disclosure, a mechanism is provided for reabsorption of aqueous humor that has been expelled from the anterior chamber CAC' of the eye 10 to reduce or otherwise stabilize intraocular pressure. One skilled in the art, however, will appreciate that aspects of the present disclosure are useful in other applications where drainage of fluid to be redirected in the body is desired.

The drainage system 100 illustrated in FIGS. 1A-1C includes a drainage device 110 for treating glaucoma. As illustrated here, this glaucoma drainage device 110 has a wall 112 (best seen in FIGS. 1B and 1C) that has a first side 114 and a second side 116. Although discussed below in connection with an intake conduit 120, it should be understood that the drainage device 110 can be a standalone product so long as some portion thereof is configured to receive fluid (e.g., directly from an incision, from the fluid conduit 120, etc.) and as such should not be considered outside the scope of this disclosure. Fluidly coupled to the drainage device 110 can be an intake conduit 120. When implanted, the intake conduit 120 extends from the anterior chamber CAC' of the eye 10 to the drainage device 110. The aqueous humor at the anterior chamber CAC' then flows through intake conduit 120 and into the drainage device 110.

Material selection of the drainage device 110 can contribute to its functionality and relatively low profile in comparison to other devices known in the art. The drainage device 110 can comprise biocompatible materials, including microporous materials such as expanded polytetrafluoroethylene (ePTFE) as discussed below. The intake conduit 120 can include biocompatible materials that are flexible and suitable for use in constructing elongate members. Some such suitable materials can include silicone, polytetrafluoroethylene, polypropylene, polymethyl methacrylate, acrylic, polyurethane, silastic, and metal. Such construction of the drainage system 100 is particularly useful for surgical implantation.

In general, surgical implantation of drainage devices, such as the drainage system 100, involve risk of abnormal pressures within the eye 10. For instance, when drainage devices are surgically implanted, such as in surgeries that require the creation of a bleb (as indicated by the dashed lines around the device 110) under the exterior surface tissue of the eye 10 (i.e., the conjunctiva 13), surrounding tissues fresh from the insult of the surgery do not provide appreciable flow resistance to aqueous flow until sufficient wound healing occurs. During this early post-operation period, the patient is at risk of hypotony of the eye 10 (e.g., too low eye pressure). To avoid hypotony, measures are taken to manage flow through the drainage device 110 for a period of time. For example, surgeons traditionally 'tie-off' a portion of the intake conduit 120 near its proximal end for a period of time and release the tie after surgical wound healing has sufficiently progressed such that the surrounding tissue will provide the necessary flow resistance. In certain commercial glaucoma shunt devices, a restrictive flow 'valve' is added distal of the intake conduit 120 where a plate section is located. These devices, however, are relatively stiff and bulky and still can result in hypotony. To the contrary, advantageously, drainage devices, systems, and methods according to principles of the present disclosure include low profile devices that generate appreciable flow resistance in the early post-operation period, e.g., to avoid hypotony.

With reference to FIGS. 1B and 1C, a non-limiting example implantation of the drainage system 100 is shown. In this example, the drainage system 100 is shown disposed in a subconjunctival space 11 between the conjunctiva 13 and the sclera 15 of the eye 10. The drainage system 100 is shown oriented such that the first layer 114 extends along the sclera 15 and such that the second layer 116 extends along the conjunctiva 13. It will be appreciated that the portion of the second layer 116 that interfaces with the conjunctiva 13 may be configured to promote or permit tissue ingrowth, as discussed below. It will also be appreciated that the portion of the first layer 114 that interfaces with the sclera 15 may additionally or alternatively be configured to promote or permit tissue ingrowth, as discussed below. Such configurations help minimize relative movement between the drainage device 110 and the surrounding tissue.

Moreover, the intake conduit 120 is shown in FIGS. 1B and 1C as extending from the drainage device 110, and extending through a scleral access, perforation, or hole 'H' (e.g., made by a physician during the implantation procedure according to known methods) such that a first end 122 (e.g., a proximal end) accesses the anterior chamber CAC' and places a port 271 in communication therewith. In some embodiments, when implanted, aqueous humor enters the first end 122 of the intake conduit 120 and travels to a second end 124 (e.g., a distal end) of the intake conduit 120 in fluid communication with the drainage device 110. Together, the wall 112 and the intake conduit 120 can define a flow passage 140 along which the drainage flows through the drainage device 110. In some embodiments the second end 124 is positioned within the drainage device 110 such that the evacuated aqueous humor enters a reservoir 130 defined within the drainage device 110 and penetrates through the various diffusion membranes of the drainage device 110, where the aqueous humor is then absorbable by the surrounding and/or ingrown tissue.

Figure 2C:
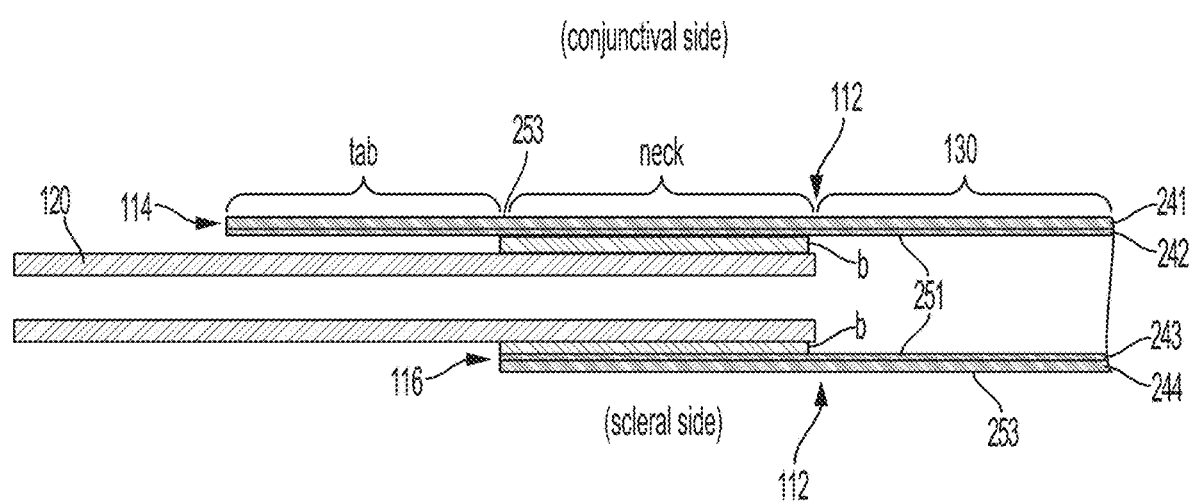
FIG. 2C is a cross-sectional view of the drainage system of FIG. 2A taken at section B-B with the drainage system in a deflated state and having a conjunctival tab.
Figure 2D:
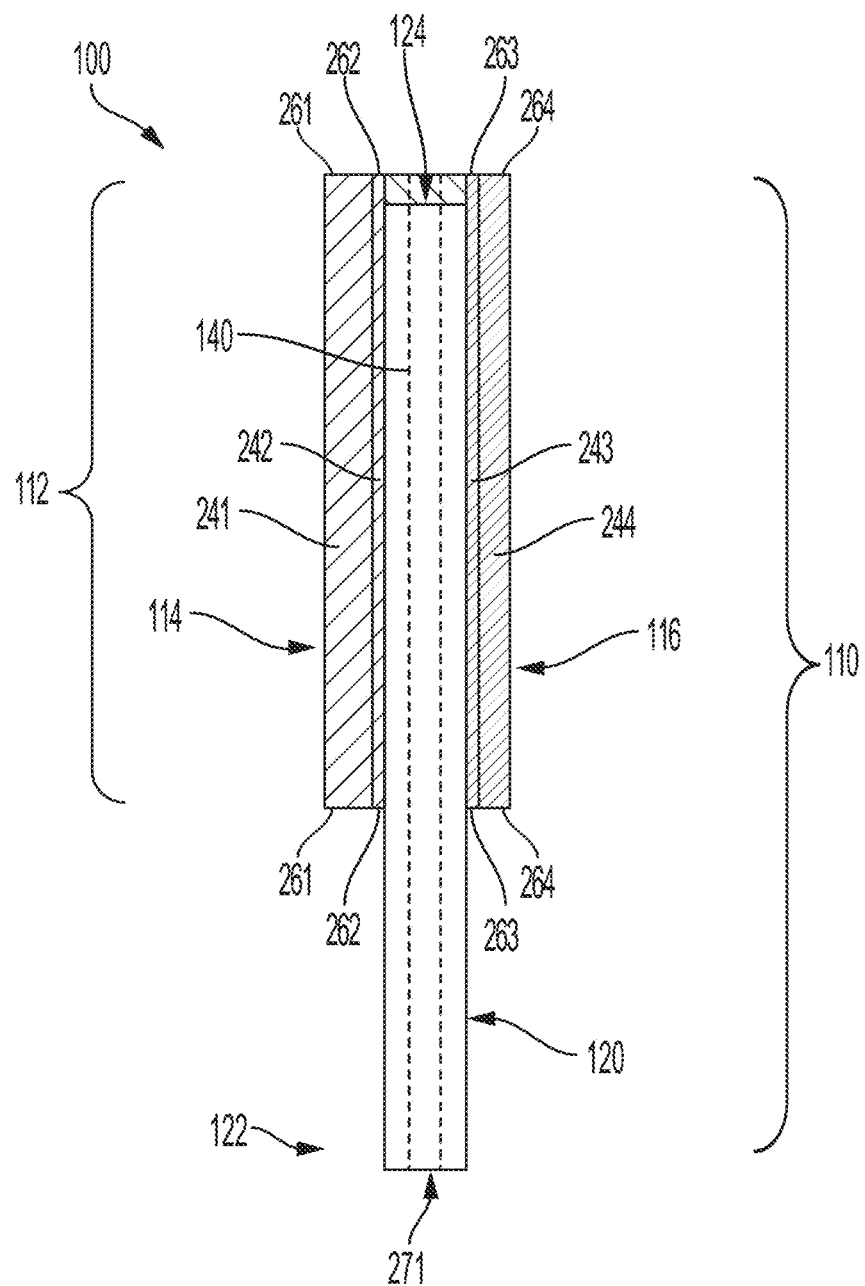
FIG. 2D is a cross-sectional view of the drainage system 100 of FIG. 2A taken at section C-C with the drainage system in the deflated state and having first and second layers with different microstructure and thickness.
Figure 2E:
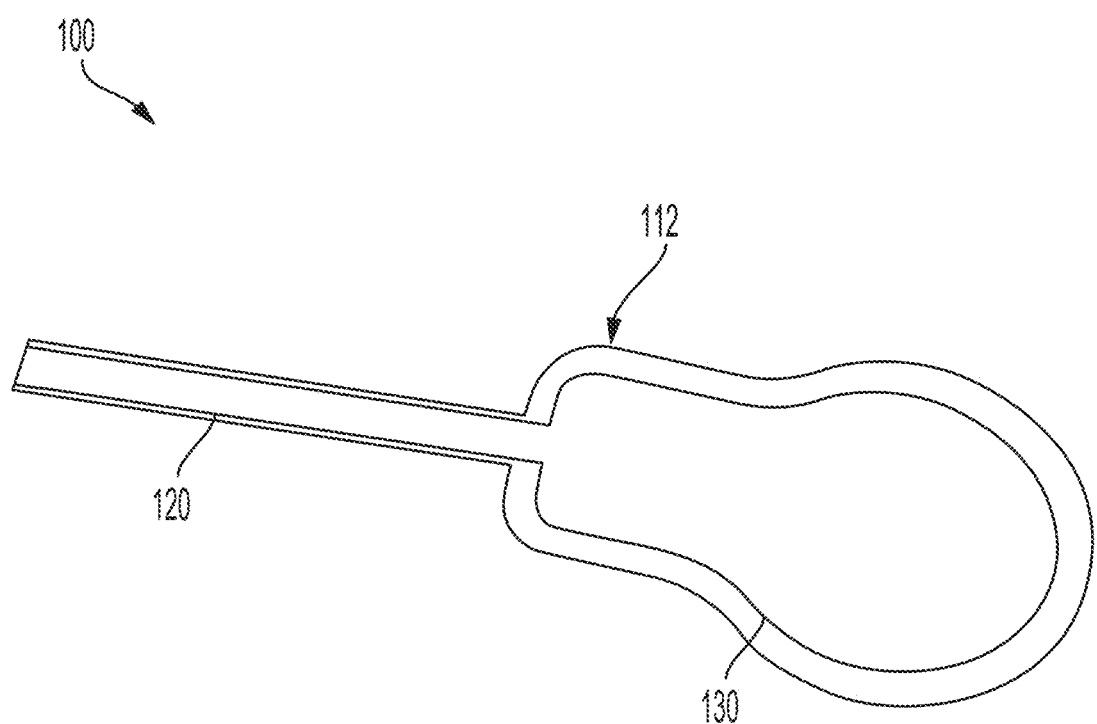
FIG. 2E is a perspective view of an alternative, miniature embodiment of the drainage system 100 of FIG. 2A.

Turning to FIGS. 2A-2E, various aspects of an example drainage system 100 in the form of a glaucoma shunt 110 are shown. FIG. 2A shows a side-view illustration of a drainage system 100. FIG. 2B shows a bottom-view illustration of the drainage system 100 of FIG. 2A. FIG. 2C shows a cross-sectional view of the drainage system 100 of FIG. 2A taken at section B-B with the drainage system 100 in a deflated state. This drainage system 100 illustrates a conjunctival tab to prevent erosion of the conjunctiva 13 by the conduit 120, a neck where the conduit 120 is bonded (e.g., via adhesive at "b") to the wall 112, and a reservoir 130 at a distal end of the conduit 120. FIG. 2D shows a cross-sectional view of the drainage system 100 of FIG. 2A taken at section C-C with the drainage system 100 in the deflated state. FIG. 2E shows a perspective view of an alternative, miniature embodiment of the drainage system 100 of FIG. 2A. As is also the case in FIGS. 1A-1C, here, the drainage system 100 relates to draining fluid from one portion of a patient's body to another. Notably, the conduit 120 can be inserted into the reservoir 130 at variable depth such as at a shallow depth as shown in FIG. 2C or a major depth in as shown in FIG. 2D so long as fluid is allowed to escape the distal end 124 of the conduit 120 to fill the reservoir 130. Such devices can have a low profile with appreciable fluid flow resistance in the early post-operation period to avoid hypotony.

Being a glaucoma shunt 110, the drainage system 100 shown in these figures is useful for draining a fluid from the eye. This drainage can proceed from an internal portion (e.g., the anterior chamber) of the eye to a surrounding tissue external to an eye. The drainage device 110 can include a wall 112 that defines a reservoir 130 disposed within the wall 112. The reservoir 130 can be configured to be in fluid communication with the eye to receive the drainage from the internal portion of the eye into the reservoir 130. The wall 112 may be integrated into or altogether form a body of the drainage device 110. In this regard, the body can have a wall 112 defining an internal reservoir 130 within the body and an internal reservoir opening (e.g., at or around adhesive 'b' in FIG. 2C) that is arranged in the wall 112 so as to communicate with the internal reservoir 130. As often described herein, this wall 112 is continuous (e.g., a continuous wall 112) but other types of walls 110 with sealed discontinuities are also contemplated.

The wall 112 can include a microporous material that transitions from a hydrophobic state to a hydrophilic state. In examples, the wall 112 is configured to provide a variable flow resistance as the wall 112 transitions from the hydrophobic state to the hydrophilic state. The drainage device 110 can include a flow passage 140 that is configured to facilitate the drainage of a fluid from the internal portion of the eye to a surrounding tissue that is external to the eye. Notably, the flow passage 140 can include a variable flow resistance to the drainage that passes through the flow passage 140. The flow passage 140 can have a first flow resistance portion with a first flow resistance and a second flow resistance portion with a second flow resistance. Optionally, as explained in more detail below, the first flow resistance can be different from the second flow resistance.

The wall 112 can be a multi-layered structure comprising one or more microstructures. The wall 112 can also be a continuous single-layer structure comprising multiple sub-layers within the continuous single-layer structure or that can define opposing sides of the continuous single-layer structure that present one porosity on a first side and a second porosity on a second side of the single-layer structure. In this regard, examples of the wall 112 can include a first layer 114 having a first microporous membrane 241 engaging a second microporous membrane 242 and a second layer 116 comprising a third microporous membrane 243 engaging a fourth microporous membrane 244. In many instances, this engaging between the first and second microporous membranes 241, 242 and the third and fourth microporous membranes 243, 244 is such that the first and second microporous membranes 241, 242 and the third and fourth microporous membranes 243, 244 respectively are integrally formed with each other. In certain instances, the first and second layers 114, 116 can comprise more or less microporous membranes, some such configurations are discussed in U.S. application Ser. No. 15/922,692 entitled "Integrated aqueous shunt for glaucoma treatment" and filed on Mar. 15, 2018, the full contents of which are incorporated herein by reference.

The presentation of varying microporous materials within the continuous single-layer structure can facilitate operation of the reservoir 130. As fluid flows into the reservoir 130, the fluid can engage the microporous material of the wall 112. Under certain circumstances, the second and third microporous membranes 242, 243 are engaging each other along peripheral edges 247 of the drainage device 110. For instance, the second and third microporous membranes 242, 243 can engage at the periphery of the first and second layers 114, 116 to define a reservoir 130 disposed between the second and third microporous membranes 242, 243. This engagement can be a bond that is a hermitically sealing bond, e.g., to ensure structural integrity of the reservoir 130. In certain instances, the second and third microporous membranes 242, 243 may initially contact or be in close proximity to one another such that, to initially inflate the reservoir 130, the fluid can engage the interface between the second and third microporous membranes 242, 243. In this regard, initially and thereafter, the reservoir 130 can be configured to move between a deflated state in which the second and third microporous membranes 242, 243 resist fluid flow therebetween and an inflated state in which fluid is allowed to flow between the second and third microporous membranes 242, 243. In certain instances, the first and fourth microporous membranes 241, 244 can remain unbonded to each other while in other instances it may be useful to engage them to one another (e.g., similarly to the engagement of the second and third microporous membranes 242, 243).

Arrangement of the microporous material to form the wall 112 can be such that wetting of the microporous material is promoted at an external side 253 of the wall 112 before an internal side 251 of the wall 112. In this regard, the internal side 251 of the wall 112 can form the reservoir 130. In examples, the first layer 114 and the second layer 116 are in a stacked configuration such that the first microporous membrane 241 and the fourth microporous membrane 244 are the outermost membranes of the wall 112 and the second microporous membrane 242 and third microporous membrane 243 are the innermost membranes of the wall 112.

In examples, the microporous material can comprise ePTFE. In this regard, the microporous material can be configured to transition from the hydrophobic state to the hydrophilic state based on a wetting of the microporous material with the fluid, and wherein the microporous material is configured such that wetting of an outer portion of the wall 112 occurs before wetting of the surfaces defining the reservoir 130. In examples, the hydrophilic state promotes tissue ingrowth. In some such examples, the hydrophilic state can define a first side of the microporous material, and the hydrophobic state can define a second side of the microporous material. Furthermore, other materials similar to ePTFE are contemplated. Those other materials can include polymers, such as, but not limited, to polyethylene, polyurethane, polysulfone, polyvinylidene fluorine (PVDF), polyhexafluoropropylene (PHFP), perfluoroalkoxy polymer (PFA), polyolefin, fluorinated ethylene propylene (FEP), acrylic copolymers and other suitable fluoro-copolymers.

Drainage from the internal portion of the eye can flow through the drainage device 110 via a flow passage 140 as exemplified in FIGS. 1C and 2D but also as presented in other figures defining a reservoir and/or a tube to allow a fluid to pass into the device. The flow passage 140 can include portions (e.g., some or all) of the wall 112 and, optionally, an intake conduit 120 as discussed in further detail below. In this regard, in an example, fluid can flow into the reservoir 130 via the flow passage 140 after being received at the wall 112 via an intake conduit 120 or directly and then out of the reservoir 130. For instance, upon a first instance of the reservoir 130 filling with fluid, the reservoir 130 can gradually move from the deflated state toward the inflated state. The fluid can then remain in the reservoir 130 until portions of the wall 112 transition from the hydrophobic state to the hydrophilic state. In such instances, the biologic fluid can penetrate through the wall 112 (e.g., from the internal side 251 of the wall 112 to either the external side 253 or peripheral edge of the wall 112) to be diverted into surrounding portions of the body at the wall 112.

In an embodiment that may in part or in whole use bonding to secure membranes together, the bonding of the microporous material can occur at the peripheral edges 261, 262, 263, 264 of the microporous membranes 241, 242, 243, 244 in the drainage device 110. In particular, the first microporous membrane 241 is shown with a first peripheral edge 261, the second microporous membrane 242 is shown with a second peripheral edge 262, the third microporous membrane 243 is shown with a third peripheral edge 263, and the fourth microporous membrane 244 is shown with a fourth peripheral edge 264. As alluded to above, any combination of these microporous membranes 241, 242, 243, 244 can be bonded at their respective peripheral edges 261, 262, 263, 264. In examples, the second and third microporous membranes 242, 243 are bonded at their peripheral edges 262, 263 to form the reservoir 130 therebetween the second and third microporous membranes 242, 243. In some such examples, the first and fourth microporous membranes 241, 244 are unbonded from the second and third peripheral edges 262, 263 of the second and third microporous membranes 242, 243 respectively. In some such examples, the first and fourth microporous membranes 241, 244 are unbonded from each other in part or entirely. In any of these instances, the bonding at peripheral edges 261, 262, 263, 264 of the microporous membranes 241, 242, 243, 244 can be a sealing bond and can optionally accommodate and sealingly bond additional structures, such as the intake conduit 120, to the drainage device 110. In an alternative embodiment similar to the embodiment described above, the bonding can be applied as described except between the first and second membranes 241 and 242 which can be replaced with a single unified layer with sub-layers having the properties of the first and second membranes, and except between the third and fourth membranes 243 and 244 which can likewise be replaced with a single unified layer with sub-layers having the properties of the third and fourth membranes.

Notably, at least a portion of the continuous wall 112 can have a wall portion (e.g., some or all of the wall 112) composed of a microporous material. The wall portion can have a wall portion internal side 251 facing the internal reservoir 130 and a wall portion external side 253 that opposes the wall portion internal side 251 and faces the exterior region of the human eye. The wall portion internal side 251 can have a low porosity surface extending an entirety of the wall portion internal side 251. The wall portion external side 253 can have an alternating surface comprising the low porosity surface disposed between high porosity surfaces.

The conduit 120 can be arranged so as to be extending from the body by a conduit length. The conduit 120 can have opposing first and second conduit ends 122, 124 defining a passage through the conduit 120 such that the passage extends between the opposing first and second conduit ends 122, 124. The first conduit end 122 can be engaging the internal reservoir opening to provide a fluidic connection between the second conduit end 124 and the internal reservoir 130. The conduit length can be sufficient enough to dispose the first conduit end 122 at the exterior region of the human eye and to dispose the second conduit end 124 at the interior region of the human eye. In examples, the fluidic connection between the second conduit end 124 and the internal reservoir 130 further extends from the internal reservoir 130 through the microporous material to provide a fluidic communication from the internal reservoir 130 to the exterior region of the human eye. This fluidic communication can define a flow path through the microporous material. As further described below, the flow path through the microporous material can be in a direction that is directed away from the internal reservoir 130 and/or proceeds from a low porosity microporous region to a high porosity microporous region.

Various features of another example of a drainage system 100 consistent with various aspects of the present disclosure is shown in FIG. 2E. In particular, like other drainage devices 100 discussed elsewhere herein, FIG. 2E shows a drainage system 100 having a wall 112 with a reservoir 130 defined therein and an intake conduit 120 that is in fluid communication with the reservoir 130. As is also the case in FIGS. 1A-1C and 2A-2D, here, the drainage system 100 relates to draining fluid from one portion of a patient's body to another. Such devices can have a low profile with appreciable fluid flow resistance in the early post-operation period to avoid hypotony. This device 110 may be smaller in size (e.g., in one or multiple dimensions, including length, width, and thickness) and therefore more suitable for smaller patients than the device 110 in FIGS. 2A-2D. In some examples, thickness of the device 110 (that is, a maximum thickness of the shunt or shunt body 110) may range from about 25 µm to about 30 µm, about 30 µm to about 40 µm, about 40 µm to about 50 µm, about 50 µm to about 60 µm, from about 60 µm to about 70 µm, from about 70 µm to about 80 µm, from about 80 µm to about 90 µm, from about 90 µm to about 100 µm, from about 10 µm to about 150 µm, from about 150 µm to about 200 µm, from about 200 µm to about 250 µm, from about 250 µm to about 300 µm, from about 300 µm to about 350 µm, from about 350 µm to about 400 µm, from about 400 µm to about 450 µm, from about 450 μm to about 500 μm, or any other suitable value or range therebetween and/or combination of ranges thereof.

The drainage system 100 shown here is similar in many respects to the drainage systems discussed above. For instance, the drainage system 100 shown here can include first and second layers as discussed with respect to FIGS. 2A-2D. These layers are bonded (e.g., at second and third microporous membranes) around an intake conduit 120 similar to that discussed with respect to FIGS. 1A-1C. Although shown extending to a particular location, the distal end of the intake conduit 120 can be positioned (e.g., more proximally or distally than illustrated, suspended between or positioned along the internal side of the reservoir 130, etc.) such that it is in communication with the reservoir 130. Other variations will be apparent to those skilled in the art.

As discussed above, drainage from the internal portion of the eye into the reservoir 130 can be facilitate by creating a flow passage therebetween. An example medium for creating such a fluid passage is via an intake conduit 120. The intake conduit 120 can be a hollow member that is optionally elongate and flexible, such as a shunt. The intake conduit 120 can be arranged to be in fluid communication with the reservoir 130 and optionally in sealing engagement therewith. In this regard, the intake conduit 120 can have the second end thereof communicating with the reservoir 130 and the opposing first defining a port. As such, the first end can be a proximal end of the intake conduit 120, and the second end can be a distal end of the intake conduit 120. The intake conduit 120 can be configured for placement within the eye to facilitate a drainage from the internal portion of the eye, through the port, and to the reservoir 130.

Additional configurations of drainage devices with variable resistance are discussed in detail with additional explanations in U.S. Provisional Application No. 63/276,170, entitled BIOLOGICAL FLUID DRAINAGE DEVICES, SYSTEMS, AND METHOD, filed on Nov. 5, 2021, and U.S. application Ser. No. 17/980,417, entitled FLUID DRAINAGE DEVICES, SYSTEMS, AND METHOD, filed on Nov. 3, 2022, the entire disclosure of each of which is herein incorporated by reference in its entirety.

Figure 3A:
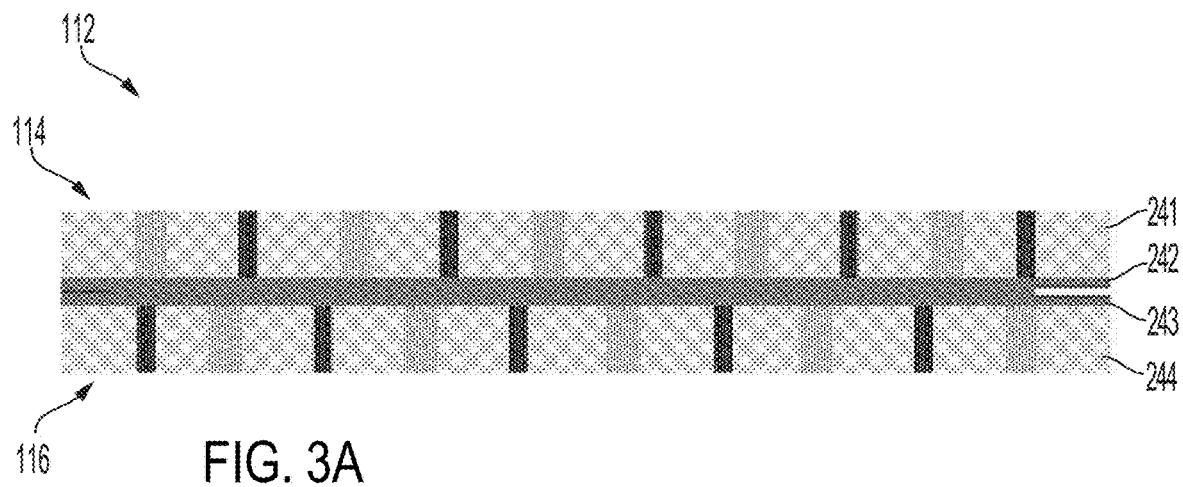
FIG. 3A is a schematic view of wall of the drainage device in a deflated state.
Figure 3B:
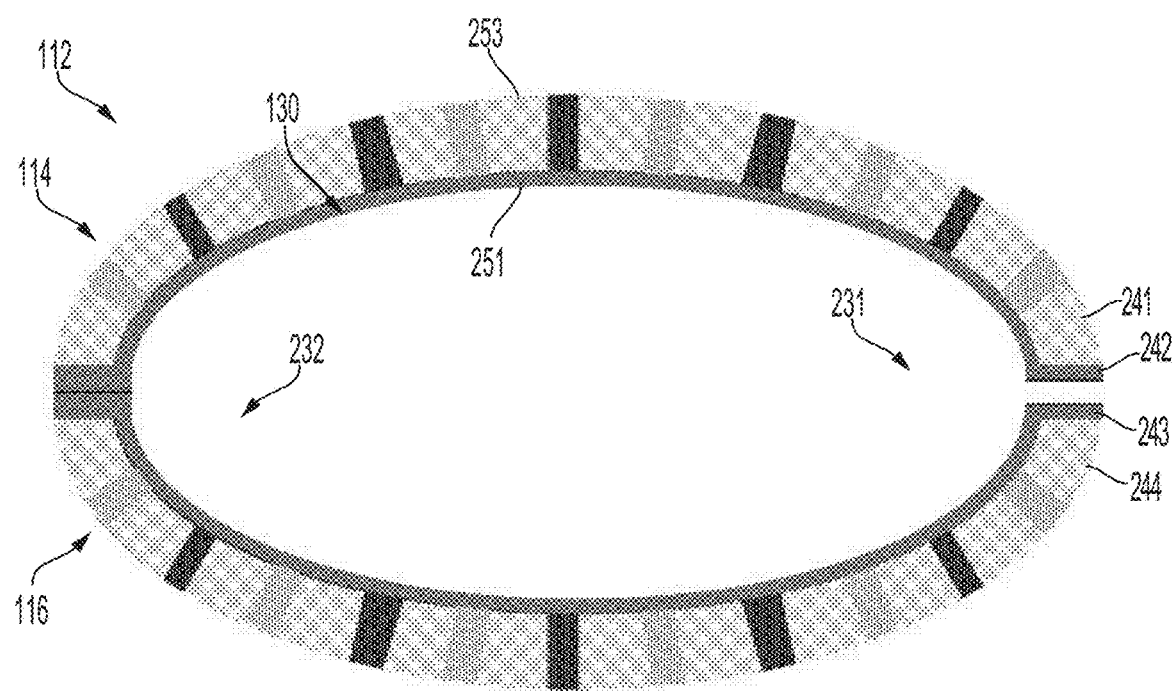
FIG. 3B is a schematic view of the wall of the drainage device in an inflated state.

Details of the microporous material will now be discussed with reference to FIGS. 3A-3C. For clarity, these figures omit showing the conduit but it is understood that the conduit can be placed in fluid communication with the reservoir 130 as discussed elsewhere herein. In particular, FIGS. 3A and 3B show cross-sectional views of the wall 112 in the drainage system with a reservoir 130 disposed therein taken along a midsection of a width of the drainage system. More specifically, FIG. 3A shows the drainage device in a deflated state (where little to no fluid is in the reservoir 130); and FIG. 3B shows the drainage device in an inflated state (where fluid has collected in the reservoir 130 so as to cause the reservoir 130 to inflate). FIG. 3C is a close-up view of a microstructure in the drainage system of FIGS. 3A and 3B. Displayed at the bottom of FIG. 3C is: "5.00 kV 4.2 mm×500 SE 1/23/2018," and the distance between two consecutive lines as shown at the bottom right hand corner represents 10 μm.

With reference to FIGS. 3A and 3B, a microstructure, through which fluid penetrates, can be included within a portion (e.g., some or all) of the microporous material. The microstructure can comprise multiple deposits of microporous membranes therein such that the microporous material is a multi-membrane material. Grouped or coupled deposits of microporous membranes can form a layer of the microporous material, which can be overlapped, folded, or similarly arranged. Under these circumstances, a reservoir 130 can be formed with a reservoir proximal section 231 and a reservoir distal section 232 and can diffuse collected fluid into surrounding tissue outside of the wall 112.

Inflation of the reservoir 130 can occur at the unbonded portions of the wall 112. As noted above, the second and third microporous membranes 242, 243 can be bonded at their peripheries such that interior portions thereof are unbonded. As these portions are unbonded, they are free to separate from each other (or one from the other) to allow the reservoir 130 to fill with fluid. The reservoir 130 can have a reservoir proximal section 231, which can be positioned adjacent the distal end of the intake conduit as further discussed below, and a reservoir distal section 232 that is positioned opposite of the reservoir proximal section 231. Fluid flow into (or within) the reservoir 130 can be directed from the distal end of the intake conduit toward a periphery of chamber. In this regard, the reservoir proximal section 231 can be configured to inflate before the reservoir distal section 232.

Engagement of the fluid with the microporous material can impart a flow resistance, which can result in pressure within the reservoir 130. For instance, second and third microporous membranes 242, 243 of the wall 112 can be situated adjacent to each other and can optionally be in contact with each other. As the reservoir 130 fills, the second and third microporous membranes 242, 243 can be gradually forced apart by fluid flowing into the reservoir 130. For instance, because the interior surface of the reservoir 130 can initially be hydrophobic, flow into the reservoir 130 can build pressure thereby forcing inflation of the reservoir 130 (e.g., second and third chambers being forced away from each other). As the wall 112 transitions from the hydrophobic state to the hydrophilic state and the fluid flow engages the reservoir 130, a variable flow resistance can be imparted to the fluid flow. The variable flow resistance can correspond to a rate of change in pressure with respect to flow rate over time. In examples, the wall 112 transitions from the hydrophobic state having a first flow resistance, to a partially hydrophilic state having a second flow resistance, to the hydrophilic state having a third flow resistance; and wherein the first flow resistance is greater than both the second flow resistance and the third flow resistance, and the second flow resistance is greater than the first flow resistance.

Diffusion rates of fluid from the reservoir 130 through the wall 112 can be influenced by the flow rate, which increases with decreasing flow resistance. As the reservoir 130 is inflated and the microporous material transitions from the hydrophobic state to the hydrophilic state, this diffusion can occur in many directions (e.g., radially outward from the reservoir 130, through unbonded portions of the peripheral edge, etc.). When flow into the reservoir 130 is less than flow out of the reservoir 130, the reservoir 130 can move from the inflated state toward the deflated state. On the other hand, when flow into the reservoir 130 is more than flow out of the reservoir 130, the reservoir 130 can move from the deflated state toward the inflated state. Assuming continuous flow into the reservoir 130, the reservoir 130 can remain in the inflated state, in an intermediate state between the inflated and deflated states. In any of these instances, there is a pressure associated with the amount of flow and/or a fill level of the reservoir 130. After collection of the fluid in the reservoir 130, fluid can be diffuse via penetration through the wall 112 at various rates depending on the state of transition of the microporous material.

Permeabilities of each layer of the microporous material can vary across dimensions (e.g., the thickness or length) of the microstructure therein. Under these circumstances, in certain instances, a first microporous membrane 241 permeability of the first microporous membrane 241 can be higher than a second microporous membrane 242 permeability of the second microporous membrane 242. Similarly, a fourth microporous membrane 244 permeability of the fourth microporous membrane 244 can be higher than a third microporous membrane 243 permeability of the third microporous membrane 243. In examples, the second microporous membrane 242 permeability can be about the same as the third microporous membrane 243 permeability. In examples, the first microporous membrane 241 permeability can be about the same as the fourth microporous membrane 244 permeability. In some such examples, each of the second microporous membrane 242 permeability and the third microporous membrane 243 permeability are different from the first microporous membrane 241 permeability and the fourth microporous membrane 244 permeability.

Porosities of membranes within the microporous material can be arranged to influence tissue ingrowth capabilities at portions thereof. It may be desired that tissue ingrowth occurs at portions of the wall 112 (e.g., at an external side 253 of the wall 112) and resisted at other portions of the wall 112 (e.g., at the reservoir 130). Tissue ingrowth at the external side 253 of the wall 112 can fix the device at an implanted location, and resisting ingrowth at the reservoir 130 can inhibit the reservoir 130 from being uninflatable due to tissue growth across the reservoir 130. For this function to be achieved, porosity at one side of the microporous material can be greater than that of another opposing side of the microporous material. In this regard, the microporous material can have a tight side (e.g., where the porosity is greater) and an open side (e.g., where the porosity is lesser). In examples, the second and third microporous membranes 242, 243 can be configured to resist tissue ingrowth. In some examples, the first and fourth microporous membranes 241, 244 are configured to permit tissue ingrowth, and wherein the second and third microporous membranes 242, 243 have an expanded state that is maintained adjacent to the bonded peripheral edges of the first and second layers 114, 116.

Penetrations in the microstructure can permit penetration of fluid into the microporous material. These penetrations can vary in size, e.g., based on the function of a given microporous membrane. In examples, either or both of the first and fourth microporous membranes 241, 244 can include penetrations that range in size (or average size) to permit ingrowth of vessels and other tissues. In further examples, either or both of the second and third microporous membranes 242, 243 are configured or selected such that the penetrations therein are generally sized to minimize, resist, or prevent the ingrowth and attachment of tissue, while maintaining aqueous humor permeability.

Internal portions of the microporous material can have varying porosities as can be seen in FIG. 3C. The internal portions can extend between the wall internal side 251 and the wall external side 253. At any of these portions of the wall, the porosity can comparatively range in degree from low porosity (LP), medium-low porosity (MLP), medium porosity (MP), medium-high porosity (MHP), and high porosity (HP). Assuming for discussion purposes here that drainage travels along a relatively straight path through a microporous material so as to sequentially engage porosities of the wall portion internal side 251, a uniform internal portion, and the wall portion external side 253, the combined flow resistance can be represented by likewise concatenating their respective porosities. For instance, the wall portion internal side 251 typically has a low porosity throughout (e.g., to resist tissue ingrowth into the reservoir 130), and portions of the interior portions and wall portion external side 253 can have any of the aforementioned degrees of porosity. Under these circumstances when the internal portion has a medium porosity and, for example, the internal portions have a medium porosity and the wall portion external side 253 has a high porosity, the flow passage through the microporous material from the reservoir 130 to tissue surrounding the device can be represented as LP-MP-HP. More examples are discussed here below.

Various flow paths can be present within the microporous material. Relatively linear flow paths may comprise regions LP1-LP4-LP5, for example or LP3-MHP1-MP1-MLP1. Under some conditions, e.g., where there is high pressure in the reservoir 130, at least some flow may proceed through the most direct path through the microporous material, such as LP1-LP4-LP5 or LP2-HP1-HP2. Although some flow paths may be relatively straight, there are also flow paths that are nonlinear. For instance, under certain conditions, at least some flow may proceed to flow through areas of increasingly less resistance such as LP1-HP1-HP2 or LP3-MHP1-HP1-HP2. As will be appreciated, the microstructure of the microporous materials may undergo modification processes to obtain certain types of flow through the microstructure. For instance, the microstructure may have relatively uniform layers across layered within the microstructure, or as shown here, have variable portions throughout the thickness of the microporous material.

In examples, the wall portion defines a wall portion thickness extending between the wall portion internal side 251 and the wall portion external side 253. The wall portion thickness can define an internal region of the wall portion having a transition porosity that is between a porosity of the low porosity surface of the wall portion internal side 251 and a porosity of the high porosity surface of the wall portion external side 253. In addition, or in alternative, the internal region can have an internal region porosity that is equal to porosities of the low porosity surfaces of the internal side and the external side. In addition, or in alternative, the internal region can have an internal region porosity that is equal to a porosity of the low porosity surface of the internal side. In addition, or in alternative, the internal region can have an internal region porosity that is equal to a porosity of the high porosity surface of the external side.

Figure 4A:
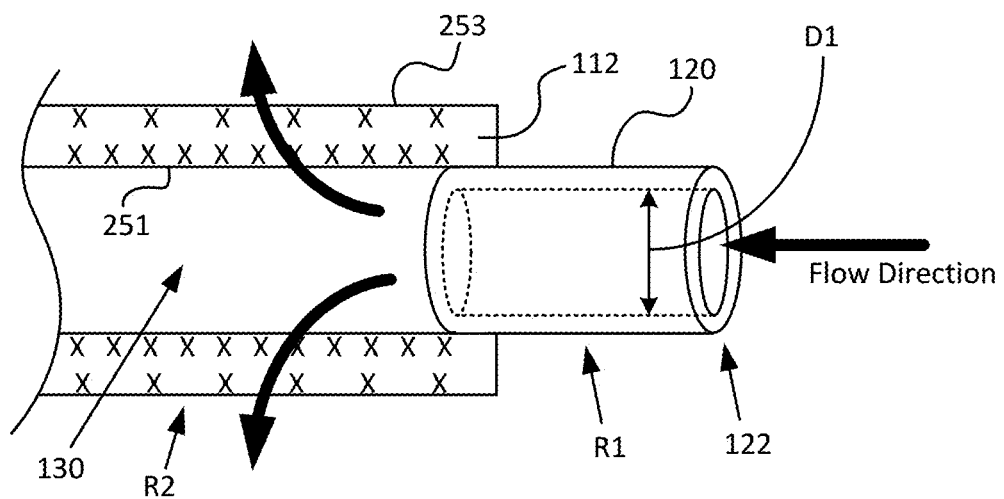
FIGS. 4A through 4D each shows one of various configurations of a drainage device that may have undergone modification processes to have varying degrees of resistance.
Figure 4B:
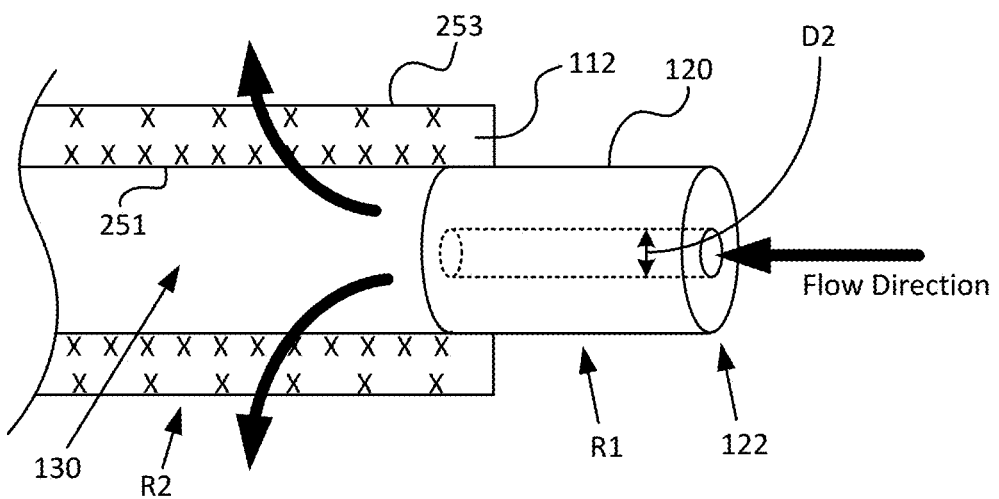
Figure 4C:
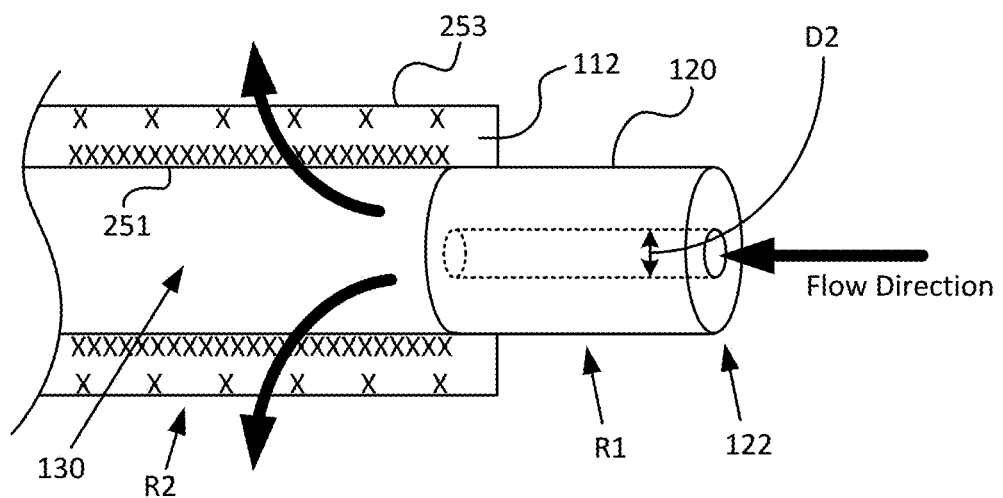
Figure 4D:
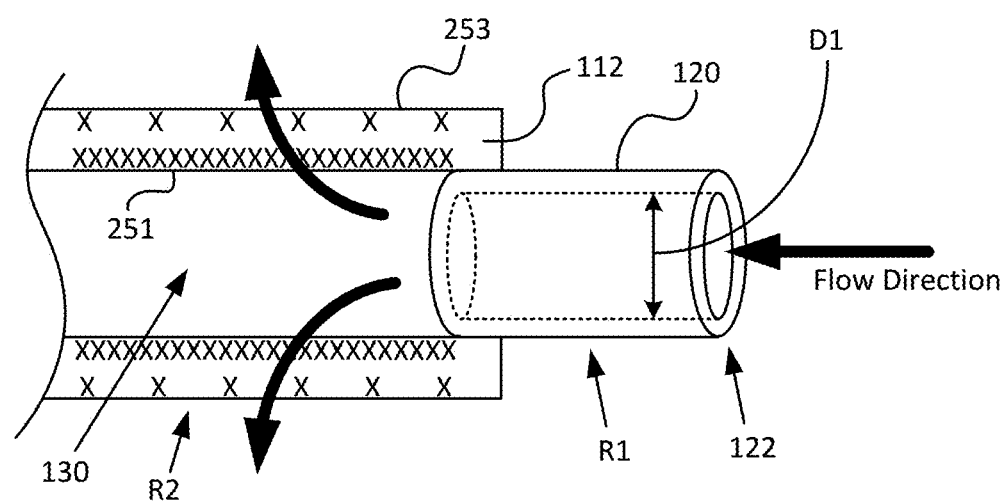

FIGS. 4A through 4E show various configurations of drainage devices with different modifications to achieve certain flow resistances along a flow path provided by the wall 112 and the conduit 120. In particular, four configurations (FIGS. 4A, 4B, 4C, and 4D) are shown where a tightness (as indicated by the distance between consecutive x marks along the internal side 251) of the microporous material in the wall 112 and/or the inner diameter of the conduit 120 (diameter D1 or D2 according to the configurations) is modified. For instance, the configuration of FIG. 4A can be considered a base configuration where the microporous material in the wall 112 has a nominal porosity and the diameter of conduit 120 is a nominal diameter D1. In comparison to the configuration of FIG. 4A, the configuration of FIG. 4B shows a similar tightness but a smaller inner diameter D2 (where, by definition, D2<D1) of the conduit 120 which may increase flow resistance thereat. In comparison to the configuration of FIG. 4A, the configuration of FIG. 4C shows a tighter porosity (x marks are positioned closer together along the internal side 251 of the wall 112) but a similar inner diameter (D2). The configuration of FIG. 4D shows the similarly tight porosity as in the configuration of FIG. 4C but the nominal inner diameter D1 similar to the configuration of FIG. 4A. The configurations of FIGS. 4A through 4D also show "resistors" R1 (for the conduit 120) and R2 (for the wall 112) and FIG. 4E shows how pressure along the flow path can change by modifying R1 and R2 at various points. For example, in the configurations as currently described, reducing the inner diameter from D1 to D2 may increase the pressure by +6.9 mmHg (from FIG. 4A to FIG. 4B), increasing the tightness of the internal side 251 of the wall 112 may increase the pressure by +91.8 mmHg (from FIG. 4B to FIG. 4C), and increasing the inner diameter from D2 to D1 while maintaining the tightness may decrease the pressure by −8.3 mmHg (from FIG. 4C to FIG. 4D).

The pressure along the flow path may be measured at the first end (proximal end) 122, which is where the fluid flows into the intake conduit 120, as shown by the bold arrow labeled "Flow Direction". Furthermore, the fluid passes into the reservoir 130 and leaves the device through the external side 253 of the wall 112 as shown by the bold curved arrows. In some examples, the tightness of the external side 253 may remain the same as the tightness of the internal side 251 is modified. In some examples, the effect of modifying the tightness of the external side 253 may be negligible or minimal compared to the effect of modifying the tightness of the internal side 251 of the wall 112.

Modifications to the microporous material and/or conduit 120 can be used to tune an overall flow resistance of the drainage device. There may be any number of resistances provided along the flow path, but for conciseness, the examples disclosed herein include two or three resistance portions, the principles of which can be extrapolated to cover any number of resistances in the drainage device. Beginning with a drainage device 110 with at least two flow resistances, the first flow resistance and the second flow resistance can be oriented in a series arrangement such that the fluid flowing through the flow passage encounters the first flow resistance before encountering the second flow resistance. In examples, the first flow resistance corresponds to a diameter of the flow passage. In this regard, inner and/or outer diameters of the conduit 120 can define the first flow resistance. In examples, the flow passage extends between a microporous material (e.g., from the conduit 120 when one is present) that is configured to transition from a hydrophobic state to a hydrophilic state when exposed to the drainage such as when the reservoir is in an initial uninflated state. Under these circumstances, the second flow resistance can correspond to a rate of change in pressure with respect to a flow rate over time as the fluid engages the microporous material. In examples, the microporous material has a variable porosity across a thickness of the microporous material. In examples, the rate of change corresponds to a tightness in a porosity of the microporous material.

Example combinations of flow resistances along the flow passage will now be described. Drainage flowing through the flow passage can encounter the plurality of flow resistances defined therein. Each flow resistance in the plurality of flow resistances at various components or portions of components. Each such flow resistance can vary in magnitude along the length of the flow passage.

For instance, for illustration purposes, the first flow resistance and the second flow resistance can be said to be oriented in a series arrangement in view of the configurations of FIGS. 4A through 4D. In this regard, fluid flow through the flow passage can encounter the first flow resistance (e.g., 'R1') before encountering the second flow resistance (e.g., 'R2'). It should be noted that, in some examples, R1 and R2 can be representative of a single component (e.g., the intake conduit 120 or the drainage device 110) in the drainage system 100, or of multiple components (e.g., R1 is the intake conduit 120 and R2 is the drainage device 110) in the drainage system 100 to represent a plurality of sequential flow resistances as shown in FIGS. 4A through 4D, where R1 and R2 are different from each other. For instance, the first flow resistance portion can be provided by the conduit 120, and the second flow resistance portion can be provided by the wall 112 of the drainage device. In further instances, both the first and third flow resistance portions can be provided by the conduit 120 or alternatively provided by the wall 112. In and of these examples, the first flow resistance can be less than the second flow resistance. In other examples, the first flow resistance can be greater than the second flow resistance.

In examples, the flow passage can have additional flow resistances (e.g., third, fourth, fifth, and so on). For instance, the flow passage can have a third flow resistance portion with a third flow resistance. In examples, each of the first flow resistance and the third flow resistance can be higher than the third flow resistance. In examples, each of the first flow resistance, the second flow resistance, and the third flow resistance can be different from one another. In examples, the first and second flow resistances can be defined by the intake conduit 120, and the third flow resistance can be defined by the drainage device 110. In other examples, the first and second flow resistances can be defined by the drainage device 110, and the third flow resistance can be defined by the intake conduit 120. In yet other examples, each of the first, second, and third flow resistances can be defined by the intake conduit 120 or alternatively by the drainage device 110. These examples are just some of many examples provided by the present disclosure.

Note that the numbers shown in the bar graph of FIG. 4E are for illustration purposes only. One skilled in the art will appreciate that many modification combinations exist and are well within the scope of the present disclosure.

Figure 5A:
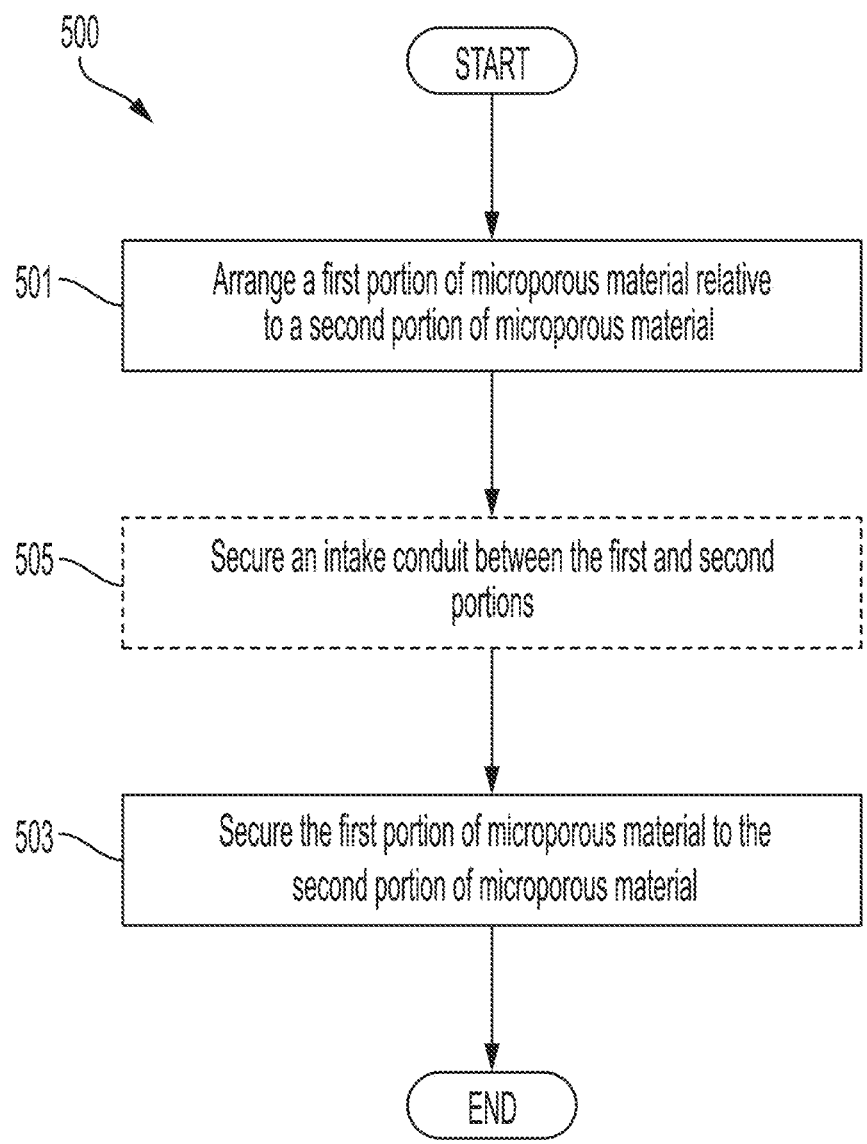
FIG. 5A is a flowchart of a method of manufacture consistent with various aspects of the present disclosure.

FIG. 5A shows a flowchart of a method 500 consistent with aspects of the present disclosure. As shown, the method 500 can be useful for forming glaucoma drainage device is disclosed herein and can include drainage systems disclosed elsewhere herein, including the drainage system 100. At step 501, the method 500 can include arranging a first portion of a first microporous material over a second portion of a second microporous material. Each of the first microporous material and the second microporous material that transitions from a hydrophobic state that to a hydrophilic state. At step 503, the method 500 can include securing the first portion to the second portion so as to form a wall that has a reservoir therebetween. The reservoir can be configured to be in fluid communication within the eye to receive a drainage from an internal portion of the eye into the reservoir. The wall can define a variable flow resistance as the wall transitions from the hydrophobic state to the hydrophilic state. In examples, at step 505, the method 500 can include securing an intake conduit between the first portion and the second portion. The intake conduit can be configured to receive the drainage.

A user may take care when constructing the drainage system, particular as it pertains to bonding portions thereof. In examples, securing the first portion to the second portion can include refraining from bonding the first microporous membrane to the fourth microporous membrane. In examples, securing the first portion to the second portion can include arranging the first layer and the second layer in a stacked configuration such that the first microporous membrane and the fourth microporous membrane are the outermost membranes of the wall and the second microporous membrane and third microporous membrane are the innermost membranes of the wall.

Figure 5B:
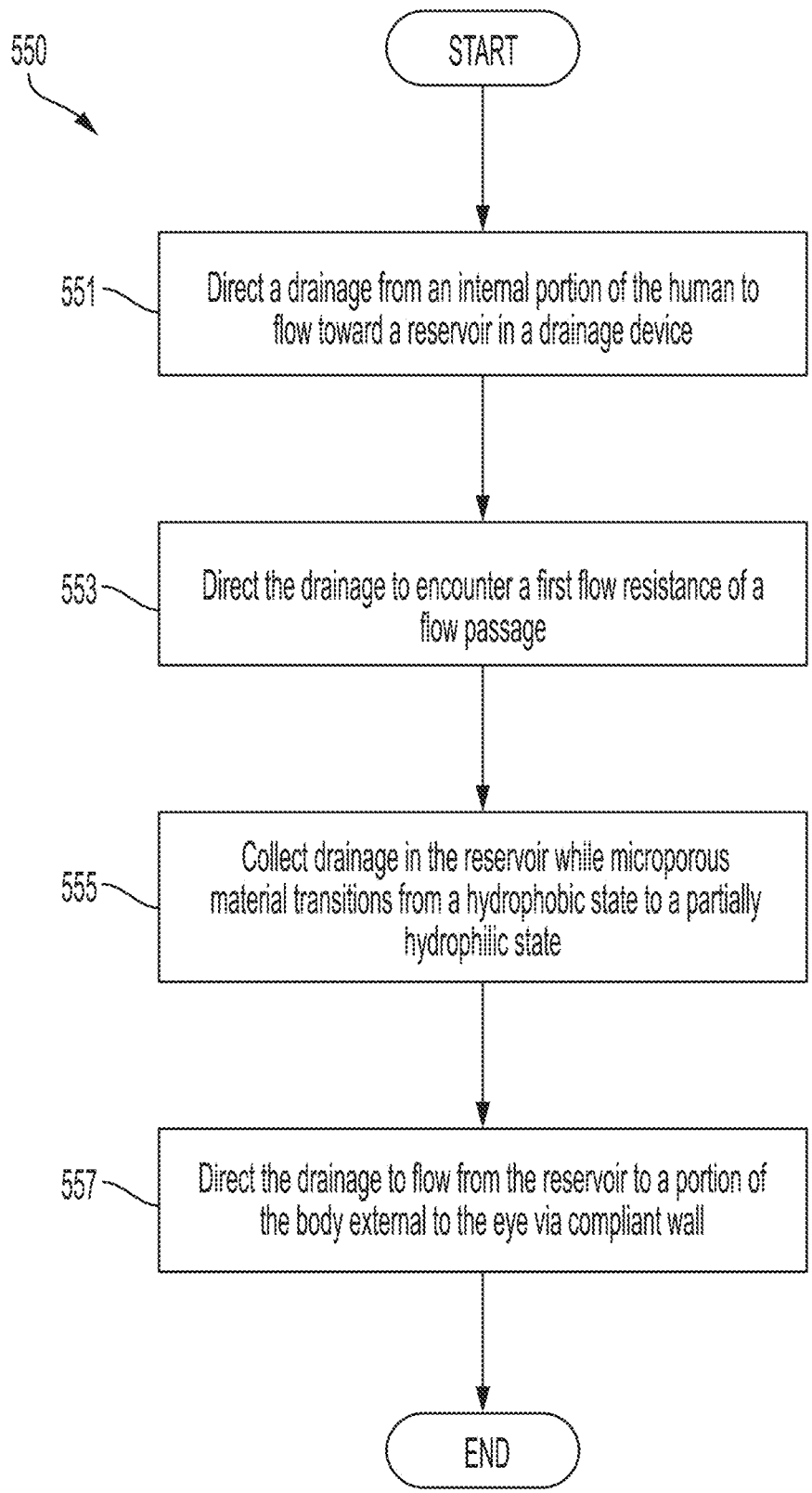
FIG. 5B is a flowchart of a method of use consistent with various aspects of the present disclosure.

Another method 550 is shown in FIG. 5B. This method a method of use for drainage devices disclosed elsewhere herein, including the drainage device 110. At step 551, the method 550 can include directing a drainage from an internal portion of the human to flow toward a reservoir in a drainage device. At step 553, the method 550 can include directing the drainage to encounter a first flow resistance of a flow passage. At step 555, the method 550 can include collecting drainage in the reservoir until microporous material transitions from a hydrophobic state to a partially hydrophilic state. At step 557, the method 550 can include directing the drainage to flow from the reservoir to a portion of the body external to the eye via compliant wall.

The system shown in FIGS. 1A-1C is provided as an example of the various features of the system and, although the combination of those illustrated features is clearly within the scope of invention, that example and its illustration are not meant to suggest the inventive concepts provided herein are limited from fewer features, additional features, or alternative features to one or more of those features shown in FIGS. 1A-1C. For example, in various embodiments, the components and/or characteristics of the system shown in FIG. 1A-1C may include the components and characteristics described with reference to any other figure, such as FIGS. 2A-2E, 3A-3C, 4A through 4E, and 5A and 5B. It should also be understood that the reverse is true as well. One or more of the components depicted in FIGS. 1A-1C can be employed in addition to, or as an alternative to components depicted in FIGS. FIGS. 2A-2E, 3A-3C, 4A through 4E, and 5A and 5B. This goes for any figure and the components and characteristics shown therein and discussed with reference thereto herein.

Figure 6A:
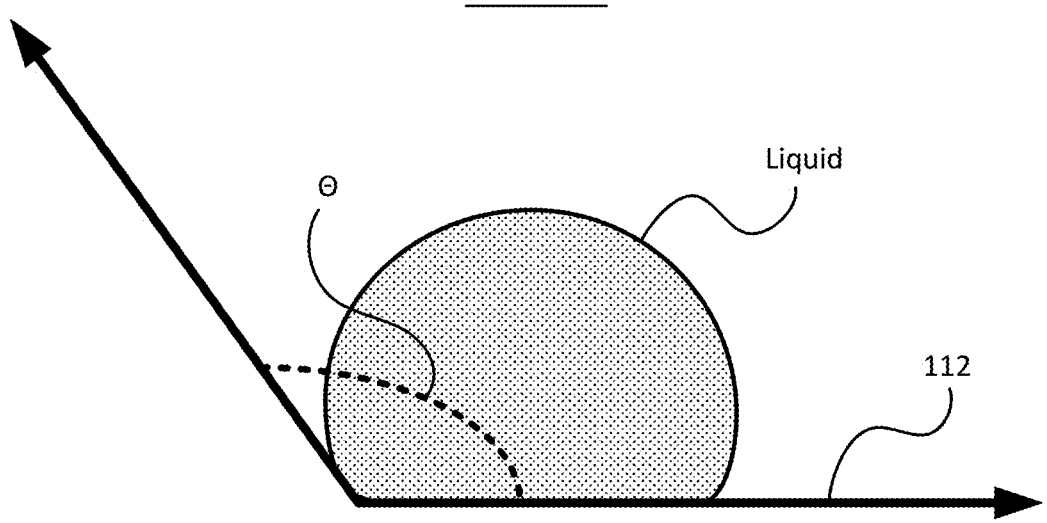
FIGS. 6A and 6B are schematic side views of a sessile drop method test performed on a surface for determining hydrophobicity/hydrophilicity.
Figure 6B:
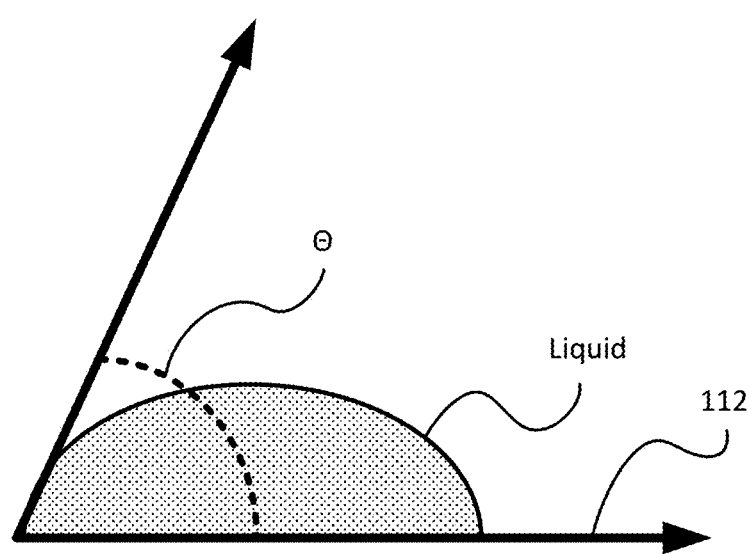

FIGS. 6A and 6B show an example of how to test whether a surface is hydrophobic or hydrophilic, also referred to as a "sessile drop method". Such a test is typically performed with an optical tensiometer which ranges from manual instruments to completely automated systems. In both of these examples, a drop of liquid or fluid ("Liquid") is placed on a surface that is to be tested, which in this case is the wall 112 (represented by the horizontal arrow) of the glaucoma drainage device 110. Subsequently, a static contact angle (Θ) of the liquid is measured from the surface, i.e. the wall 112, by taking an image of the drop using a high-resolution camera, from which the contact angle may be automatically determined using any suitable software. In FIG. 6A, the contact angle is an obtuse angle, i.e. greater than 90 degrees, which indicates that the surface of the wall 112 is hydrophobic. In FIG. 6B, the contact angle is an acute angle, i.e. less than 90 degrees, which indicates that the surface of the wall 112 is hydrophilic. In some examples, the transition from the hydrophobic state to the hydrophilic state constitutes a decrease in the contact angle by at least 10 degrees, at least 15 degrees, at least 20 degrees, at least 25 degrees, at least 30 degrees, at least 35 degrees, at least 40 degrees, at least 45 degrees, at least 50 degrees, at least 55 degrees, at least 60 degrees, at least 65 degrees, at least 70 degrees, at least 75 degrees, at least 80 degrees, at least 85 degrees, at least 90 degrees, or any other suitable value or range therebetween. As previously explained, the wall 112, or more specifically a microporous material thereof, may transition from a hydrophobic state to a hydrophilic state, and the speed or rate of this transition can be measured using this method.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A glaucoma shunt for draining a fluid from an eye to a tissue surrounding the eye, the glaucoma shunt being implantable at least in part within the tissue of the eye, the glaucoma shunt comprising:
a shunt body that is formed from a microporous material that is arranged so as to form a reservoir within the shunt body; and
a conduit having a proximal end in fluid communication with the reservoir and a distal end that opposes the proximal end, the conduit distal end being insertable into the eye so as to facilitate a drainage of the fluid into the conduit via the distal end of the conduit,
wherein the conduit and the reservoir together define a flow passage along which the drainage of the fluid flows through the conduit, to the reservoir, and into the tissue surrounding the eye via the microporous material, wherein the flow passage presents a variable flow resistance over time along the conduit that has a plurality of sequential flow resistances with a first flow resistance and a second flow resistance defined therein such that the first flow resistance is different from the second flow resistance,
wherein the shunt body has a continuous wall that defines the reservoir and a reservoir opening in the continuous wall communicating with the internal reservoir and through which the conduit is engagingly received, and
wherein at least a portion of the continuous wall has a wall portion composed of the microporous material, the wall portion having an internal side facing the internal reservoir and an opposing external side facing the exterior region of the human eye, the wall portion internal side having a low porosity surface extending an entirety of the wall portion internal side, the wall portion external side having an alternating surface comprising the low porosity surface disposed between high porosity surfaces.

2. The glaucoma shunt of claim 1, wherein the first flow resistance is less than the second flow resistance.

3. The glaucoma shunt of claim 1, wherein the first flow resistance is greater than the second flow resistance.

4. The glaucoma shunt of claim 1, wherein the microporous material defines a third flow resistance of the flow passage.

5. The glaucoma shunt of claim 4, wherein the microporous material is configured to transition from a hydrophobic state to a hydrophilic state when exposed to the fluid while maintaining structural integrity of the microporous material, and wherein the second flow resistance corresponds to a rate of change in pressure with respect to a flow rate over time as the fluid engages the microporous material that defines the reservoir, and wherein the transition occurs without dissolution or disintegration of the microporous material.

6. The glaucoma shunt of claim 5, wherein the rate of change corresponds to a tightness in a porosity of the microporous material.

7. The glaucoma shunt of claim 6, wherein the microporous material has a variable porosity across a thickness of the microporous material.

8. The glaucoma shunt of claim 4, wherein the first flow resistance corresponds to a ratio of an inner diameter of the conduit to a thickness of the conduit.

9. The glaucoma shunt of claim 1, wherein the first flow resistance and the second flow resistance are oriented in a series arrangement such that the fluid flowing through the flow passage encounters the first flow resistance before encountering the second flow resistance.

10. The glaucoma shunt of claim 1, wherein the variable flow resistance along the conduit further includes a third flow resistance.

11. The glaucoma shunt of claim 10, wherein each of the first flow resistance and the third flow resistance is greater than the second flow resistance.

12. The glaucoma shunt of claim 10, wherein each of the first flow resistance, the second flow resistance, and the third flow resistance is different from one another.

13. A drainage device for directing a drainage from an internal portion of an eye to a portion of a body external to the eye, the drainage device comprising:
   a device body having a continuous wall that defines a reservoir and a reservoir opening in the continuous wall communicating with the reservoir;
   a conduit in fluid communication with the reservoir through the reservoir opening, wherein the conduit is engagingly received through the reservoir opening; and
   a flow passage that is configured to facilitate the drainage of a fluid from the internal portion of the eye to a surrounding tissue that is external to the eye, wherein the flow passage includes a variable flow resistance to the drainage that passes through the flow passage, the flow passage having a first flow resistance portion with a first flow resistance and a second flow resistance portion with a second flow resistance, the first flow resistance being different from the second flow resistance,
   wherein at least a portion of the continuous wall has a wall portion composed of a microporous material, the wall portion having an internal side facing the reservoir and an opposing external side facing the exterior region of the human eye, the wall portion internal side having a low porosity surface extending an entirety of the wall portion internal side, the wall portion external side having an alternating surface comprising the low porosity surface disposed between high porosity surfaces.

14. The drainage device of claim 13, wherein the first flow resistance is less than the second flow resistance.

15. The drainage device of claim 13, wherein the first flow resistance is greater than the second flow resistance.

16. The drainage device of claim 13, wherein the flow passage is positioned between a microporous material that is configured to transition from a hydrophobic state to a hydrophilic state when exposed to the drainage while maintaining structural integrity of the microporous material, and wherein the second flow resistance corresponds to a rate of change in pressure with respect to a flow rate over time as the fluid engages the microporous material, and wherein the transition occurs without dissolution or disintegration of the microporous material.

17. The drainage device of claim 16, wherein the rate of change corresponds to a tightness in a porosity of the microporous material.

18. The drainage device of claim 17, wherein the microporous material has a variable porosity across a thickness of the microporous material.

19. The drainage device of claim 13, wherein the first flow resistance corresponds to a diameter of the flow passage.

20. The drainage device of claim 13, wherein the first flow resistance and the second flow resistance are arranged in series such that the fluid flowing through the flow passage encounters the first flow resistance before encountering the second flow resistance.

21. The drainage device of claim 13, wherein the flow passage further has a third flow resistance portion with a third flow resistance.

22. The drainage device of claim 21, wherein each of the first flow resistance and the third flow resistance is greater than the second flow resistance.

23. The drainage device of claim 21, wherein each of the first flow resistance, the second flow resistance, and the third flow resistance is different from one another.

24. A method of forming a drainage device, the method comprising:
   arranging one or more microporous materials so as to form a device body with a continuous wall that defines a reservoir within the device body and a reservoir opening in the continuous wall communicating with the reservoir, the reservoir being configured to receive and accumulate fluid; and
   securing a conduit to the reservoir such that the conduit is in fluid communication with the reservoir through the reservoir opening, wherein the conduit is engagingly received through the reservoir opening,
   wherein the conduit and the reservoir define a flow passage of the drainage device, and wherein the flow passage includes a variable flow resistance to a drainage that passes through the flow passage, the flow passage having a first flow resistance portion with a first flow resistance and a second flow resistance portion with a second flow resistance, the first flow resistance being different from the second flow resistance,
   wherein arranging the one or more microporous materials includes forming at least a portion of the continuous wall as a wall portion composed of the microporous material, the wall portion having an internal side facing the reservoir and an opposing external side facing an exterior region of a human eye, and
   wherein the shunt body has a continuous wall that defines the reservoir opening in the continuous wall communicating with the internal reservoir and through which the conduit is engagingly received, and
   wherein the wall portion internal side is formed to have a low porosity surface extending an entirety of the wall portion internal side, and the wall portion external side is formed to have an alternating surface comprising the low porosity surface disposed between high porosity surfaces.

25. The method of claim 24, wherein forming the reservoir comprises securing a first portion of the microporous material to a second portion of the microporous material so as to form the reservoir therebetween, the method further comprising securing the conduit between the first portion and the second portion, the conduit being configured to receive the drainage.

26. A glaucoma drainage device for draining a fluid from an interior region of a human eye to an exterior region of the human eye, the glaucoma drainage device comprising:

a body having a continuous wall defining an internal reservoir within the body and a reservoir opening in the continuous wall communicating with the internal reservoir; and a conduit extending from the body by a conduit length, the conduit having opposing first and second conduit ends defining a passage through the conduit extending between the opposing first and second ends, the conduit first end engaging the internal reservoir opening to provide a fluidic connection between the conduit second end and the internal reservoir, the conduit length being sufficient to dispose the conduit first end at the exterior region of the human eye and to dispose the conduit second end at the interior region of the human eye, wherein at least a portion of the continuous wall has a wall portion composed of a microporous material, the wall portion having an internal side facing the internal reservoir and an opposing external side facing the exterior region of the human eye, the wall portion internal side having a low porosity surface extending an entirety of the wall portion internal side, the wall portion external side having an alternating surface comprising the low porosity surface disposed between high porosity surfaces.

27. The glaucoma drainage device of claim 26, wherein the wall portion defines a wall portion thickness extending between the internal side and the external side, the wall portion thickness defining an internal region of the wall portion having a transition porosity that is between a porosity of the low porosity surface of the internal side and a porosity of the high porosity surface of the external side.

28. The glaucoma drainage device of claim 26, wherein the wall portion defines a wall portion thickness extending between the internal side and the external side, the wall portion thickness defining an internal region of the wall portion extending between the low porosity surface of the internal side and the low porosity surface of the external side, the internal region having an internal region porosity that is equal to porosities of the low porosity surfaces of the internal side and the external side.

29. The glaucoma drainage device of claim 26, wherein the wall portion defines a wall portion thickness extending between the internal side and the external side, the wall portion thickness defining an internal region of the wall portion extending between the low porosity surface of the internal side and the high porosity surface of the external side, the internal region having an internal region porosity that is equal to a porosity of the low porosity surface of the internal side.

30. The glaucoma drainage device of claim 26, wherein the wall portion defines a wall portion thickness extending between the internal side and the external side, the wall portion thickness defining an internal region of the wall portion extending between the low porosity surface of the internal side and the high porosity surface of the external side, the internal region having an internal region porosity that is equal to a porosity of the high porosity surface of the external side.

31. The glaucoma drainage device of claim 26, wherein the fluidic connection between the conduit second end and the internal reservoir further extends from the internal reservoir through the microporous material to provide a fluidic communication from the internal reservoir to the exterior region of the human eye.

32. The glaucoma drainage device of claim 31, wherein the fluidic communication defines a flow path through the microporous material.

33. The glaucoma drainage device of claim 32, wherein the flow path through the microporous material is directed away from the internal reservoir.

34. The glaucoma drainage device of claim 32, wherein the flow path through the microporous material proceeds from a low porosity microporous region to a high porosity microporous region.

* * * * *